US012795114B2

(12) United States Patent
Gao et al.

(10) Patent No.: US 12,795,114 B2
(45) Date of Patent: Nov. 10, 2026

(54) CODING METHOD AND APPARATUS, DECODING METHOD AND APPARATUS, STORAGE MEDIUM, AND ELECTRONIC APPARATUS

(71) Applicant: ZTE Corporation, Shenzhen (CN)

(72) Inventors: Ying Gao, Shenzhen (CN); Ping Wu, Shenzhen (CN); Shaowei Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 115 days.

(21) Appl. No.: 18/843,764

(22) PCT Filed: Mar. 3, 2023

(86) PCT No.: PCT/CN2023/079630
§ 371 (c)(1),
(2) Date: Sep. 4, 2024

(87) PCT Pub. No.: WO2023/174076
PCT Pub. Date: Sep. 21, 2023

(65) Prior Publication Data
US 2025/0220200 A1 Jul. 3, 2025

(30) Foreign Application Priority Data
Mar. 17, 2022 (CN) ......................... 202210266047.7

(51) Int. Cl.
*H04N 19/00* (2014.01)
*H04N 19/159* (2014.01)
(Continued)

(52) U.S. Cl.
CPC ......... *H04N 19/159* (2014.11); *H04N 19/176* (2014.11); *H04N 19/196* (2014.11); *H04N 19/33* (2014.11)

(58) Field of Classification Search
CPC ...................................................... H04N 19/00
See application file for complete search history.

(56) References Cited

U.S. PATENT DOCUMENTS

2006/0153294 A1* 7/2006 Wang .................. H04N 19/129 375/E7.176
2018/0176582 A1 6/2018 Zhao et al.
(Continued)

FOREIGN PATENT DOCUMENTS

CN 101606391 A 12/2009
CN 103916670 A 7/2014
(Continued)

OTHER PUBLICATIONS

International Search Report for corresponding application PCT/CN2023/079630 filed Mar. 3, 2023; Mail date May 25, 2023.
(Continued)

*Primary Examiner* — Maryam A Nasri
(74) *Attorney, Agent, or Firm* — CANTOR COLBURN LLP

(57) ABSTRACT

Provided are a coding method and apparatus, a decoding method and apparatus, a storage medium, and an electronic apparatus. The coding method includes: determining a target type of a currently coded target sub-bitstream, and a target sign processing method and target sign processing parameters corresponding to the target type; performing target sign processing on coefficients of a current image block based on the target sign processing parameters and the target sign processing method; and coding the coefficients of the current image block based on a processing result of the target sign processing.

19 Claims, 10 Drawing Sheets

(51) Int. Cl.

| | |
|---|---|
| ***H04N 19/176*** | (2014.01) |
| ***H04N 19/196*** | (2014.01) |
| ***H04N 19/33*** | (2014.01) |

(56) References Cited

U.S. PATENT DOCUMENTS

| | | | |
|---|---|---|---|
| 2019/0208225 | A1 | 7/2019 | Chen et al. |
| 2020/0404311 | A1 | 12/2020 | Filippov et al. |

FOREIGN PATENT DOCUMENTS

| | | | |
|---|---|---|---|
| CN | 106105047 | A | 11/2016 |
| CN | 109997361 | A | 7/2019 |
| CN | 111684810 | A | 9/2020 |

OTHER PUBLICATIONS

European Search Report for Application No. 23769582.0, dated Jun. 17, 2025, 3 pages.

* cited by examiner

| | | | | | | | |
|---|---|---|---|---|---|---|---|
| 1 | 2 | 6 | 7 | 15 | 16 | 28 | 29 |
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

prediction — hypothesis reconstruction $$cost = \sum_{x=0}^{w-1} \left|(2p_{x,-1} - p_{x,-2}) - p_{x,0}\right| + \sum_{y=0}^{h-1} \left|(2p_{-1,y} - p_{-2,y}) - p_{0,y}\right|$$

| | | | | | | | |
|---|---|---|---|---|---|---|---|
| 1 | 2 | 5 | 6 | 17 | 18 | 21 | 22 |
| 3 | 4 | 7 | 8 | 19 | 20 | 23 | 24 |
| 9 | 10 | 13 | 14 | 25 | 26 | 29 | 30 |
| 11 | 12 | 15 | 16 | 27 | 28 | 31 | 32 |
| 33 | 34 | 37 | 38 | 49 | 50 | 53 | 54 |
| 35 | 36 | 39 | 40 | 51 | 52 | 55 | 56 |
| 41 | 42 | 45 | 46 | 57 | 58 | 61 | 62 |
| 43 | 44 | 47 | 48 | 59 | 60 | 63 | 64 |

CODING METHOD AND APPARATUS, DECODING METHOD AND APPARATUS, STORAGE MEDIUM, AND ELECTRONIC APPARATUS

CROSS-REFERENCE TO RELATED APPLICATION

This disclosure is a national stage filing under 35 U.S.C. § 371 of international application number PCT/CN2023/079630, filed Mar. 3, 2023, which claims the benefit of priority of Chinese patent application No. CN202210266047.7, filed on Mar. 17, 2022, the entire contents of which are incorporated herein by reference.

TECHNICAL FIELD

Embodiments of the present disclosure relate to the field of communication, and specifically to a coding method and apparatus, a decoding method and apparatus, a storage medium, and an electronic apparatus.

BACKGROUND

Video compression coding is widely applied in various digital video application scenarios, including digital television, interactive media, video conferencing, video on demand, streaming media services, remote video monitoring, video games, etc. Regardless of the application, the volume of data that needs to be transmitted is very large, placing significant demands on network transmission and storage space. By removing spatio-temporal redundant information in video data, a data volume can be effectively reduced, which not only saves storage space, but also improves network transmission efficiency.

In the related art, when sign processing is performed on coefficients of an image block, a single processing method is usually adopted, and a sign processing method is not adjusted according to different bitstream types, which results in low flexibility of the sign processing method, leading to problems of low coding efficiency and high coding complexity.

SUMMARY

Embodiments of the present disclosure provide a coding method and apparatus, a decoding method and apparatus, a storage medium, and an electronic apparatus, so as to at least solve the problems that in the related art, flexibility of a sign processing method is low, leading to low coding efficiency and high coding complexity.

According to an embodiment of the present disclosure, a coding method is provided, and includes: determining a target type of a currently coded target sub-bitstream, and a target sign processing method and target sign processing parameters corresponding to the target type; performing target sign processing on coefficients of a current image block based on the target sign processing parameters and the target sign processing method; and coding the coefficients of the current image block based on a processing result of the target sign processing.

According to an embodiment of the present disclosure, a decoding method is further provided, and includes: obtaining target sign processing methods and target sign processing parameters corresponding to various sub-bitstreams in the case of receiving a layered coding video bitstream; determining signs of coefficients corresponding to the various sub-bitstreams based on the target sign processing methods and the target sign processing parameters corresponding to the various sub-bitstreams; and decoding the various sub-bitstreams in the layered coding video bitstream based on the signs of the coefficients corresponding to the various sub-bitstreams.

According to an embodiment of the present disclosure, a coding apparatus is further provided, and includes: a first determination module, configured to determine a target type of a currently coded target sub-bitstream, and a target sign processing method and target sign processing parameters corresponding to the target type; a processing module, configured to perform target sign processing on coefficients of a current image block based on the target sign processing parameters and the target sign processing method; and an encoding module, configured to encode the coefficients of the current image block based on a processing result of the target sign processing.

According to an embodiment of the present disclosure, a decoding apparatus is further provided, and includes: an obtaining module, configured to obtain target sign processing methods and target sign processing parameters corresponding to various sub-bitstreams in the case of receiving a layered coding video bitstream; a second determination module, configured to determine signs of coefficients corresponding to the various sub-bitstreams based on the target sign processing methods and the target sign processing parameters corresponding to the various sub-bitstreams; and a decoding module, configured to decode the various sub-bitstreams in the layered coding video bitstream based on the signs of the coefficients corresponding to the various sub-bitstreams.

According to another embodiment of the present disclosure, a computer-readable storage medium is further provided. The computer-readable storage medium has a computer program stored therein, where the computer program is configured to perform the steps in the embodiment of the above coding method, or perform the steps in the embodiment of the above decoding method during operation.

According to another embodiment of the present disclosure, an electronic apparatus is further provided, and includes a memory and a processor. The memory has a computer program stored therein. The processor is configured to run the computer program so as to perform the steps in the embodiment of the above coding method, or perform the steps in the embodiment of the above decoding method.

DETAILED DESCRIPTION OF THE EMBODIMENTS

Figures 1, 2:
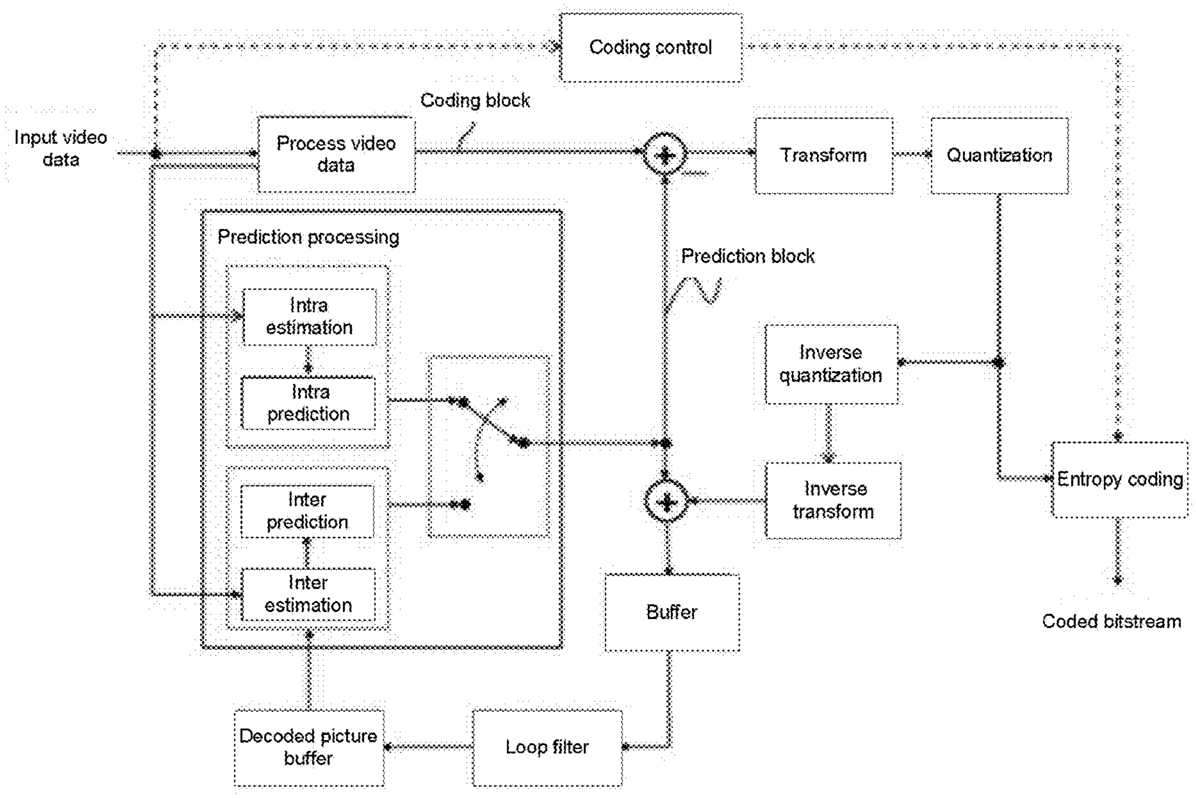
FIG. 1 is a schematic diagram of a scan order of coefficients for an 8*8 transform block in the related art.
FIG. 2 is a block diagram of logic processing of a video encoder in the related art.

Embodiments of the present disclosure are described in detail with reference to the accompanying drawings and in conjunction with the embodiments as below.

With the increasing development of video technology, the continuous improvement of video resolution, and the application and popularization of videos such as panoramic videos and 3D stereoscopic videos, the amount of data that needs to be transmitted is very large in all cases. The application of layered video coding technology, which can provide users with videos of different qualities based on network bandwidth conditions, is bound to become more and more widespread. How to provide a plurality of flexible and configurable sign processing methods under a layered video coding architecture to achieve an effect of balancing coding efficiency and coding complexity is bound to be a problem that needs to be solved in the future.

In the embodiments of the present disclosure, a method for performing sign processing on an image coefficient (which is usually a transform coefficient, and of course, may also be a quantized transform coefficient or a residual coefficient) in a layered coding (or called scalable coding) video bitstream is provided, which may provide a plurality of flexible and configurable sign processing methods for different types of bitstreams (e.g., a base layer bitstream and an enhancement layer bitstream), thereby achieving a purpose of balancing the coding efficiency and the coding complexity.

Firstly, the related art involved in the embodiments of the present disclosure is introduced.

Both H.265/high efficiency video coding (HEVC for short) standard and H.266/versatile video coding (VVC for short) standard, developed by joint video expert teams (JVETs for short) under ISO/IEC and ITU, support the concept of "layered video coding/scalable video coding". An encoder that supports scalable coding may provide a layered nested video bitstream. Different sub-bitstreams may be extracted from the layered video bitstream to meet different needs. The sub-bitstreams may have different frame rates or spatial resolutions, or have different bit rates (i.e., different video qualities) in the case of the same frame rate and the same spatial resolution. For example, a video bitstream may include a base layer sub-bitstream and at least one enhancement layer sub-bitstream. The enhancement layer sub-bitstream may be either an independent enhancement layer sub-bitstream or a dependent enhancement layer sub-bitstream. The base layer sub-bitstream may ensure that a decoding terminal may normally decode a video content. However, a videoImage obtained from the base layer sub-bitstream may be low in frame rate, resolution, or quality. The base layer sub-bitstream is usually used when a channel is limited or a channel environment is complex, thereby ensuring that the decoding terminal may receive a smooth video image that can be viewed, and providing a low-quality video content. When the channel environment is good or channel resources are abundant, the enhancement layer sub-bitstream may be transmitted. The independent enhancement layer sub-bitstream may be decoded independently to provide an enhanced video content, and the dependent enhancement layer sub-bitstream needs to be decoded together with the base layer sub-bitstream to provide an enhanced video content, thereby improving the frame rate, the resolution, or the video quality. An enhancement layer may be further layered and coded, which means that within a totalCode rate range of video bitstreams, the higher a received code rate, the better the video quality. In addition, layered coding is also widely applied in compression coding of a stereoscopic video. For example, a video image of a left viewpoint is coded as a base layer sub-bitstream, and a video image of a right viewpoint is used as an enhancement layer sub-bitstream. Efficient compression is performed on the stereoscopic video by utilizing spatial redundancy, temporal redundancy, and information redundancy between the two viewpoints. The enhancement layer sub-bitstream may also be called a non-base layer sub-bitstream, and in subsequent descriptions, the enhancement layer sub-bitstream is used uniformly for illustration.

Taking H.265/HEVC as an example, the encoder may divide a frame of image into a plurality of coding tree units (CTUs for short), and each CTU may be further partitioned into a plurality of coding units (CUs for short). Whether to use intra coding or inter coding is decided at a CU level. Each CU may also be further partitioned into one or more prediction units (PUs for short), and prediction results may also be transmitted to the decoding terminal in PU units. After predicting the PUs and obtaining residual information, a CU may also be partitioned into a plurality of transform units (TUs for short). For a video sequence with three color components, a CU may include a coding block (CB for short) for a luma component and/or two coding blocks for chroma components. A PU may include a prediction block (PB for short) for a luma component and/or two prediction blocks for chroma components. A TU may include a transform block (TB for short) for a luma component and/or two transform blocks for chroma components. It should be noted that in H.266/VVC, the concepts of the prediction unit (PU) and the transform unit (TU) defined in HEVC are eliminated, which are unified as the coding unit (CU), and meanwhile the concepts of the prediction block and the transform block are eliminated as well, which are unified as the coding block, and therefore in the solution of the present disclosure, the transform unit mentioned subsequently may also be replaced with the coding unit, and the transform block may also be replaced with the coding block.

As shown in FIG. 1, an example of a coefficient scan order for an 8*8 transform block is presented (numbers in FIG. 1 indicate the scan order), where each non-zero transform coefficient within the transform block is composed of a sign and an absolute value, and when coding each non-zero coefficient, the encoder needs to allocate a sign bit for each coefficient to indicate whether the coefficient is a positive sign or a negative sign. For example, when a sign bit value is equal to 0, it indicates that a coefficient corresponding to the sign bit is positive, when a sign bit value is equal to 1, it indicates that a coefficient corresponding to the sign bit is negative, or vice versa.

An output document from the 23rd JVET meeting, entitled "Algorithm Description of Enhanced Compression Model 2 (ECM 2)", No. JVET-W2025, describes a sign prediction method adopted by the ECM. A coefficient sign of a current block is estimated based on coefficients in adjacent blocks. A prediction result between the estimated sign and an original sign is represented by a binary value. For example, "0" indicates that the estimated sign and the original sign are the same, while "1" indicates that the estimated sign and the original sign are different. If the signs are well estimated, most of the prediction results are 0. Then, the prediction results are coded using context adaptive binary arithmetic coding (CABAC for short), thereby effectively improving coding efficiency.

To better explain the technology described in the solutions of the embodiments of the present disclosure, FIG. 2 provides a block diagram of general conceptual logical processing of a video encoder in accordance with the HEVC standard and the VVC standard. However, the applicability of the solutions of the embodiments of the present disclosure to other coding methods or standards is not excluded. A video data processing module performs image block partitioning on input video data. The video data is typically composed of a series of video image sequences, and a video image may also be referred to as an image or a frame. Video data processing includes partitioning a video image into CTUs. For a color image, the CTU includes a coding tree block (CTB for short) corresponding to luma, two coding tree blocks corresponding to chroma, and an associated syntactic structure. For a black and white image, the coding tree unit (CTU) may only include a coding tree block (CTB) corresponding to luma, and an associated syntactic structure. The CTU may further include one or more CUs. Similarly, the coding unit may include a CB corresponding to luma, two coding blocks corresponding to chroma, and an associated syntactic structure, or may only include a coding block corresponding to luma, and an associated syntactic structure. A slice may include an integer number of coding tree units (CTUs) arranged in a raster scan order, and a tile may include an integer number of coding tree units (CTUs) arranged in a rectangular shape.

In subsequent descriptions of the embodiments of the present disclosure, a video processing unit may refer to a coding tree unit (CTU), coding unit (CU), prediction unit (PU), transform unit (TU), etc. In specific cases, the video processing unit may also be a macroblock, a macroblock partition, etc. The type of video block may be a coding tree block, a coding block, a prediction block (PB), a transform block (TB), or other types of data blocks.

A prediction processing module selects an appropriate prediction mode (intra prediction or inter prediction) for the coding unit based on image features, thereby obtaining a prediction unit corresponding to the coding unit. The prediction unit may include a prediction block corresponding to luma and two prediction blocks corresponding to chroma. The appropriate prediction mode may provide a best match or minimum residual, etc. The actual selection of the prediction mode may also be determined based on rate-distortion optimization. The intra prediction may include a plurality of non-directional prediction modes and directional prediction modes, and a current image is searched for a best matching block to serve as an intra prediction block. The inter prediction involves searching for a best matching reference block in reference images (at least partially decoded images previously stored in a decoded picture buffer) based on associated inter prediction parameters, as an inter prediction block. The prediction processing unit may further partition the coding block in the coding unit into smaller sub-blocks through any combination of a quad tree, a binary tree, or a ternary tree before prediction, and perform prediction on the sub-blocks. In the embodiments of the present disclosure, unless otherwise specified, coding blocks and coding sub-blocks are not distinguished.

Subtracting a predicted image obtained through motion estimation from an image block yields a difference image, also called a residual block. For example, a corresponding pixel point value in the prediction block is subtracted from each pixel point value in the coding block, and an obtained difference of each pixel point forms a residual block.

The transform unit transforms the residual block or sub-blocks of the residual block from a spatial domain to a frequency domain, thereby obtaining a transform coefficient in the frequency domain. The transform coefficient may also be referred to as a transform residual coefficient or a residual transform coefficient, which is used to represent the residual block or the sub-blocks of the residual block in a transform block or the frequency domain. Commonly used transform methods include discrete cosine transform (DCT for short) or discrete Fourier transform (DFT for short). When the transform unit applies one or more transformations to the residual block, the transform block corresponds to the residual block. When the transform unit applies one or more transformations to a sub-block of the residual block, the transform block corresponds to the sub-block. A two-dimensional matrix composed of transform coefficients is also called a transform coefficient block.

A quantization unit quantizes the transform coefficient to obtain a quantization coefficient, which may also be referred to as a quantized transform coefficient or a quantized residual coefficient. A two-dimensional matrix composed of quantization coefficients is also called a quantization coefficient block. Since the human eye is sensitive to low-frequency characteristics of an image, such as overall brightness of an object, but insensitive to high-frequency detail information in the image, high-frequency information may be transmitted less or not at all during transmission, and only low-frequency parts are transmitted. In a quantization process, high-frequency information to which the human eye is insensitive is removed by performing fine quantization on coefficients in a low-frequency region and coarse quantization on coefficients in a high-frequency region, thereby reducing the information transmitting amount. A common quantization method involves dividing by a quantization step size. The quantization step size may be indicated by a quantization parameter (QP for short). Generally, a smaller QP value corresponds to a smaller quantization step size, resulting in less image compression loss. Conversely, a larger QP value corresponds to a larger quantization step size, leading to greater image compression loss.

There are two different destinations for a quantization coefficient of quantized output. Firstly, the quantization coefficient is sent to an entropy encoder for coding, and a coded bitstream may be output to one buffer to be stored, waiting to be sent to the decoding terminal. The other application is to send the quantization coefficient to an inverse quantization unit and an inverse transform unit to perform corresponding inverse quantization and inverse transform operations.

The inverse quantization and the inverse transform performed by the inverse quantization unit and the inverse transform unit are the inverse processes of quantization and transform respectively. After the inverse quantization process, an inverse quantization coefficient, also known as an inverse quantized residual coefficient or an inverse quantized transform coefficient is obtained. Since the quantization process is lossy, inverse quantization usually does not equal the transform coefficient before quantization. Through the inverse transform process (e.g., inverse discrete cosine transform or inverse discrete Fourier transform), an inverse transformed block in a pixel point domain may be obtained, which may also be called an inverse quantized block after inverse transform or a residual block after inverse transform.

For each pixel point pair, pixel point values of the inverse transformed block and pixel point values of the prediction block are added and combined to obtain a reconstructed block. The buffer is used to buffer or store the reconstructed block for intra motion estimation and/or intra prediction or other types of estimation and/or prediction.

A loop filter unit may filter the reconstructed block to obtain a filtered block, which may also be called a filtered reconstructed block or a reconstructed block after filtering. Commonly used loop filtering methods include sample adaptive offset (SAO for short) filtering, deblocking filtering, etc.

The decoded picture buffer (DPB for short) may receive and store the filtered block, and may also store other filtered blocks of the current image or a previously reconstructed image, and may provide the complete previously reconstructed image and/or the partially reconstructed current image for inter motion estimation and/or inter prediction.

A coding control unit records coding-related control parameters, such as a coding block partition method, a layered coding method, and control parameters related to intra prediction, inter prediction, transform, quantization, etc. A coding control module involves the entire coding process and may interact with any of the aforementioned other modules to obtain control parameters needed for a decoding process. Finally, the control parameters are provided to an entropy coding unit to be subjected to entropy coding and then are transmitted to the decoding terminal.

In some embodiments, the video encoder may include more, fewer, or partially different functional components. This is only a general introduction, and each variation will not be illustrated with a separate diagram.

In subsequent embodiments of the present disclosure, unless otherwise specified, mentioned coefficients or coding coefficients typically refer to transform coefficients, but may also refer to quantized transform coefficients or residual coefficients.

The present disclosure is described with reference to the embodiments:

- it should be noted that the terms such as "first" and "second" of the specification and claims of the present disclosure and the foregoing accompanying drawings are used to distinguish similar objects but are not necessarily used to describe specific sequences or precedence orders.

Figure 3:
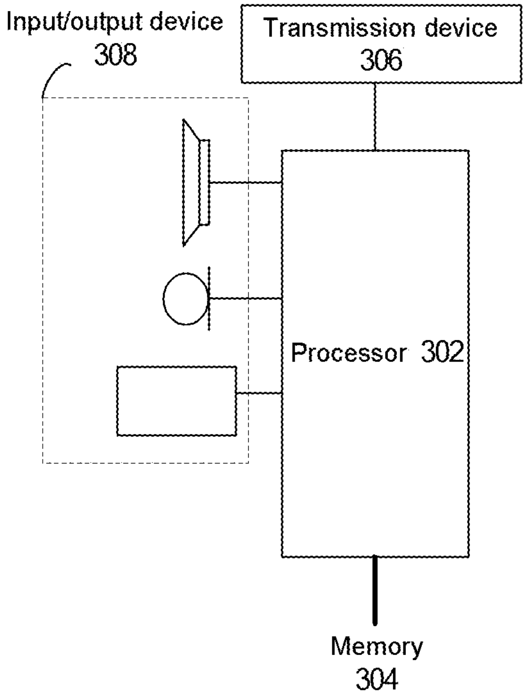
FIG. 3 is a block diagram of a hardware structure of a mobile terminal of a coding method or a decoding method according to an embodiment of the present disclosure.

The method embodiments provided by the embodiments of this application may be performed in a mobile terminal, a computer terminal, or similar arithmetic units. Taking operation on the mobile terminal as an example, FIG. 3 is a block diagram of a hardware structure of a mobile terminal of a coding method or a decoding method according to an embodiment of the present disclosure. As shown in FIG. 3, the mobile terminal may include one or more (only one is shown in FIG. 3) processors 302 (the processor 302 may include, but is not limited to, a processing apparatus such as a microcontroller unit (MCU) or a field programmable gate array (FPGA) and a memory 304 configured to store data, where the mobile terminal may also include a transmission device 306 for a communication function and an input and output device 308. Those of ordinary skill in the art can understand that the structure shown in FIG. 3 is merely exemplary, and does not limit the structure of the above mobile terminal. For example, the mobile terminal may further include more or fewer components than those shown in FIG. 3, or have a different configuration than that shown in FIG. 3.

The memory 304 may be configured to store computer programs, such as software programs and modules of application software, and computer programs corresponding to the coding method or the decoding method in the embodiments of the present disclosure. The processor 302 performs various functional applications and data processing by operating the computer programs stored in the memory 304, thereby implementing the above method. The memory 304 may include a high-speed random access memory, and may also include a non-volatile memory, such as one or more magnetic storage apparatuses, a flash memory, or another nonvolatile solid-state memory. In some examples, the memory 304 may further include memories which are remotely set relative to the processor 302, and these remote memories may be connected to the mobile terminal through a network. The examples of the above network include, but are not limited to, an Internet, an intranet, a local area network, a mobile communication network, and a combination thereof.

The transmission device 306 is configured to receive or transmit data via a network. A specific example of the above network may include a wireless network provided by a communication supplier of the mobile terminal. In an example, the transmission device 306 includes a network interface controller (NIC for short) which may be connected with other network devices through a base station so as to communicate with the Internet. In an example, the transmission device 306 may be a radio frequency (RF for short) module configured to communicate with the Internet in a wireless manner.

Figure 4:
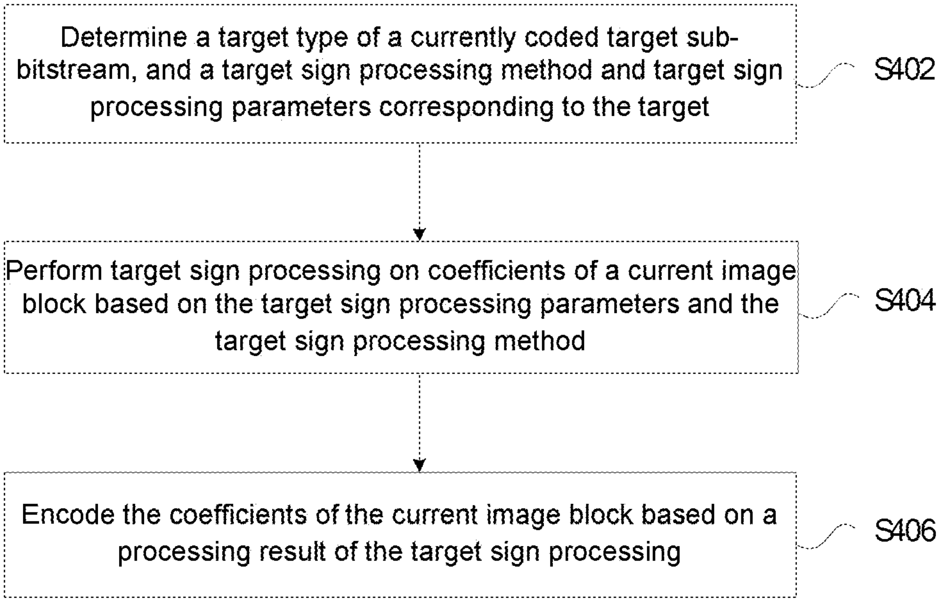
FIG. 4 is a flowchart of a coding method according to an embodiment of the present disclosure.

This embodiment provides a coding method. FIG. 4 is a flowchart of a coding method according to an embodiment of the present disclosure. As shown in FIG. 4, the process includes the following steps:

Step S402: Determine a target type of a currently coded target sub-bitstream, and a target sign processing method and target sign processing parameters corresponding to the target type.

Step S404: Perform target sign processing on coefficients of a current image block based on the target sign processing parameters and the target sign processing method.

Step S406: Encode the coefficients of the current image block based on a processing result of the target sign processing.

The above operations may be performed by a coding device (e.g., a video encoder), or a processor arranged within the coding device, or a processor arranged separately from the coding device, and of course, may also be performed by other devices with similar coding capabilities.

In the above embodiment, the currently coded target sub-bitstream may be a sub-bitstream in a layered coded video stream. The type of the currently coded target sub-bitstream includes, but is not limited to, a base layer sub-bitstream or an enhancement layer sub-bitstream. The enhancement layer sub-bitstream may further include an independent enhancement layer sub-bitstream or a dependent enhancement layer sub-bitstream.

The above target sign processing method includes at least one of a sign prediction method, a sign bit hiding method, and other types of sign processing methods. It should be noted that when sign processing is performed on the coefficients of the image block, one sign processing method may be used to process the coefficients of the image block, or the plurality of sign processing methods may be used to process the coefficients of the image block. That is, one sign processing method is used to process some of the coefficients of the image block, the coefficients processed by the different sign processing methods are different, and the plurality of sign processing methods may have corresponding processing priorities, with the highest priority is performed first.

When the plurality of sign processing methods are used, sign processing parameters for each sign processing method need to be determined. The parameters corresponding to the different sign processing methods may vary. For example, when the above target sign processing method includes a sign prediction method, sign prediction parameters corresponding to the prediction method may include, but are not limited to, the number of coefficients for sign prediction, and/or a maximum value of coefficients for sign prediction, and/or a method for sign prediction. The method for sign prediction includes, but is not limited to, a template generation method, a hypothetical reconstruction generation method, a cost function calculation method, etc. Additionally, the sign prediction parameters may be pre-specified or determined based on the type of sub-bitstream.

In the above embodiment, coding the coefficients of the current image block based on a processing result of the target sign processing includes coding absolute values and signs of the coefficients of the current image block based on the processing result of the target sign processing. That is, coding the coefficients includes coding the absolute values and the signs of the coefficients. In embodiments subsequently mentioned, the focus will be on coding the signs of the coefficients. Additionally, the absolute values of the coefficients may be coded using a conventional coding method, which will not be further elaborated later.

Through the embodiments of the present disclosure, by determining the method and the parameters for performing sign processing on the coefficients of the image block based on the type of sub-bitstreams included in the bitstream, the sign processing method can be flexibly adjusted based on the type of the bitstream, the flexibility of the sign processing method is improved, and then the purpose of balancing the coding efficiency and the coding complexity is achieved.

In an optional embodiment, before performing target sign processing on coefficients of a current image block based on the target sign processing parameters and the target sign processing method, the method further includes: determining the need for the target sign processing on the coefficients of the current image block based on a first condition. The first condition includes at least one of the following:

a feature size of the current image block, a distribution state of the coefficients of the current image block, the number of non-zero coefficients in the current image block, a processing mode of the target sign processing, a transform method, feature information of other image blocks adjacent to the current image block, local configuration information, the target type of the target sub-bitstream, priorities of a plurality of sign processing methods, features of an image where the current image block is located, features of a sequence where the image with the current image block is located, and a calculation result of a cost function or a rate-distortion function.

In the above embodiment, the order between the operation of determining the need for the target sign processing on the coefficients of the current image block and step S402 may not be limited. It is possible to first determine the need for the target sign processing on the coefficients of the current image block and then perform S402, or first perform S402 and then determine the need for the target sign processing on the coefficients of the current image block. Of course, it is also possible to simultaneously perform the operation of determining the need for the target sign processing on the coefficients of the current image block and S402.

It should also be noted that content included in the first condition may be adjusted based on actual situations, and certainly, may not be only limited to the first condition listed above.

In an optional embodiment, coding the coefficients of the current image block based on a processing result of the target sign processing includes: respectively coding coefficients that are subjected to the target sign processing and coefficients that are not subjected to the target sign processing in the current image block. A coding method for coding the coefficients that are subjected to the target sign processing may be the same as or different from a coding method for coding the coefficients that are not subjected to the target sign processing. The target sign processing method includes one or more processing methods. When the target sign processing method includes one processing method, one coding method is used to encode the coefficients in the current image block that are subjected to the target sign processing. When the target sign processing method includes a plurality of processing methods, the coefficients in the current image block that are subjected to the target sign processing based on different target sign processing methods are coded respectively, and coding methods for the coefficients that are subjected to the target sign processing based on the different target sign processing methods may be the same or different from each other. In the following, that the target sign processing method includes one processing method and the target sign processing method includes two processing methods is used as an example for illustration (a coding method processing logic for three or more processing methods that are included is similar and will not be listed here):

In the above embodiment, when the target sign processing method includes one processing method, signs of first coefficients in the current image block that are subjected to the target sign processing are coded based on a first coding method; and signs of second coefficients in the current image block, excluding the first coefficients, are coded based on a second coding method, where the first coding method and the second coding method may be the same or different. When the target sign processing method includes two processing methods, the signs of the first coefficients in the current image block that are subjected to first target sign processing are coded based on a first coding method, the signs of the second coefficients in the current image block that are subjected to second target sign processing are coded based on a second coding method, and signs of third coefficients in the current image block, excluding the first coefficients and the second coefficients, are coded based on a third coding method, where the target sign processing method includes the first target sign processing method and the second target sign processing method, and the first coding method, the second coding method, and the third coding method may all be different or at least two of them may be the same.

In an optional embodiment, coding the coefficients of the current image block based on a processing result of the target sign processing includes: determining a difference between a predicted sign and an original sign of the coefficient based on the processing result of the sign prediction processing when the target sign processing method includes a sign prediction processing method; and coding the difference based on a coding method corresponding to the sign prediction processing method. In this embodiment, the difference may be represented by a specific value, such as 0 or 1. That is, when it is determined that the predicted sign is consistent with the original sign, it indicates that the predicted sign is correct, and the difference may be represented by 0. When it is determined that the predicted sign is inconsistent with the original sign, it indicates that the predicted sign is incorrect, and the difference may be represented by 1. It should be noted that the difference may also be represented by other values or signs, such as a binary number or an English letter.

In an optional embodiment, after coding the coefficients of the current image block based on a processing result of the target sign processing, the method further includes: adding the coding result to the target sub-bitstream.

In an optional embodiment, before coding the coefficients of the current image block based on a processing result of the target sign processing, the method further includes: determining the need to encode the coefficients of the current image block according to a layered coding method based on coefficient importance. In this embodiment, there may be various types of coding methods during layered coding. For example, layered coding may be performed based on coefficient importance. Of course, layered coding may also be performed according to a pre-configured coding method, or coding may be performed in a random coding manner, and so on.

In an optional embodiment, determining the need to encode the coefficients of the current image block according to a layered coding method based on coefficient importance includes: determining the need to encode the coefficients of the current image block according to the layered coding method based on the coefficient importance using at least one of the following methods: determining based on a local configuration of an encoder, determining based on features of the current image block, determining based on a video sequence where the current image block is located, determining based on a known decoder capability or configuration for a coded bitstream to be received, determining based on an adopted dependent enhancement layer coding method, and determining based on received indicative information, where the indicative information comes from a transmitting terminal of an uncoded image or a receiving terminal of a coded image. It should also be noted that the above methods may be adjusted based on actual situations, and certainly, may not be only limited to the implementations listed above.

In an optional embodiment, the method further includes: reordering the coefficients of the current image block according to the coefficient importance; and determining a coding layer to which each coefficient belongs based on a position of each reordered coefficient of the current image block. In this embodiment, the operations of reordering and determining a coding layer to which each coefficient belongs may be performed before S406, or may be further performed before S404, or before S402. A specific execution order is not limited in this embodiment.

In an optional embodiment, after coding the coefficients of the current image block based on a processing result of the target sign processing, the method further includes one of the following:

- adding indicative information used to indicate the type of the target sub-bitstream to the target sub-bitstream; and
- adding identification information to the target sub-bitstream, where the identification information is used to indicate at least one of the following: when decoding a reference layer sub-bitstream, the decoding terminal needs to store a decoding result or decoding metadata for decoding a subsequent enhancement layer sub-bitstream; and when decoding the enhancement layer sub-bitstream, the decoding terminal obtains a decoding result or decoding metadata of the reference layer sub-bitstream that the enhancement layer sub-bitstream depends on.

In this embodiment, the decoding metadata includes, but is not limited to, an inverse transform coefficient or an inverse quantization coefficient, and the reference layer sub-bitstream includes the base layer sub-bitstream or other enhancement layer sub-bitstreams that the enhancement layer sub-bitstream depends on.

The following is a specific description of the operation of a coding terminal of the present disclosure in conjunction with the embodiments:

Specific Embodiment 1

This embodiment provides a method for predicting signs of coefficients in a layered coded video bitstream. It should be noted that this embodiment is illustrated using a sign prediction method as an example, and a relevant processing logic is also applicable to a sign bit hiding method or other sign processing methods.

Figure 5:
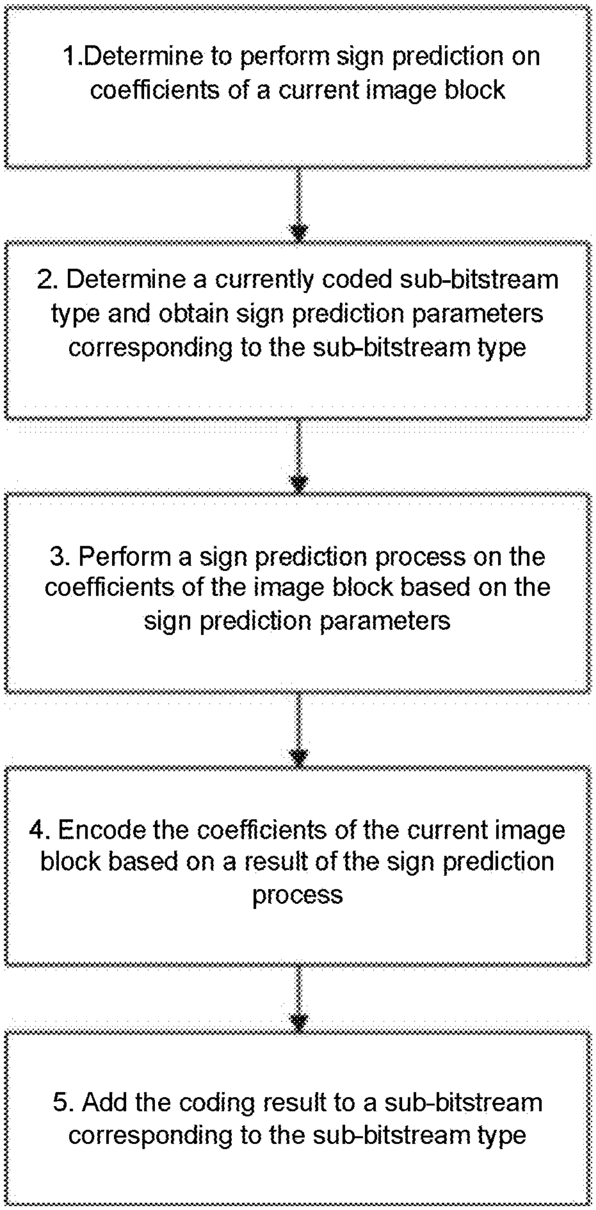
FIG. 5 is a flowchart of coding according to a specific embodiment 1 of the present disclosure.

As shown in FIG. 5, this embodiment includes the following steps:

Step 1: Determine to perform sign prediction on coefficients of a current image block.

The video encoder may decide whether to perform sign prediction on the coefficients of the current block based on certain conditions. According to the disclosed prior art, these conditions may be features of the image block, such as a size of the block, the distribution of corresponding coefficients, the number of non-zero coefficients, a prediction mode, a transform method, and information about adjacent image blocks.

Step 2: Determine a currently coded sub-bitstream type and obtain sign prediction parameters corresponding to the sub-bitstream type.

The currently coded sub-bitstream type includes, but is not limited to, a base layer sub-bitstream and an enhancement layer sub-bitstream, where the enhancement layer sub-bitstream may further include an independent enhancement layer sub-bitstream or a dependent enhancement layer sub-bitstream. The sub-bitstream type may be determined based on layer identification of the sub-bitstream.

The sign prediction parameters may include, but are not limited to, the number of coefficients for sign prediction, and/or a maximum value of coefficients for sign prediction, and/or a method for sign prediction. The method for sign prediction includes, but is not limited to, a template generation method, a hypothetical reconstruction generation method, a cost function calculation method, etc.

For the same image block, the number of parameters included in sign prediction parameters corresponding to different sub-bitstream types may be different or the same.

The value of the same sign prediction parameter corresponding to different sub-bitstream types may be different or the same.

It should be further noted that the order of step 1 and step 2 is not strictly fixed. It is possible to first determine a currently coded sub-bitstream type and obtain sign prediction parameters corresponding to the sub-bitstream type, and then determine to perform sign prediction on coefficients of a current image block. It is also possible to first determine a currently coded sub-bitstream type, determine to perform sign prediction on coefficients of a current image block, and then obtain sign prediction parameters corresponding to the sub-bitstream type.

It should be further noted that if it is determined in step 1 that two sign processing methods (i.e., the sign prediction method and the sign bit hiding method) for the coefficients of the current image block are needed based on the currently coded sub-bitstream type, determination of the currently coded sub-bitstream type may be omitted in this step.

Step 3: Perform a sign prediction process on the coefficients of the image block based on the sign prediction parameters.

Typically, to predict a sign of a coefficient, the video encoder and the video decoder may use a positive sign and a negative sign of the predicted coefficient to respectively reconstruct transform blocks, which are called "hypothetical reconstructions". The two hypothetical reconstructions are evaluated using a predefined cost function, and the hypothetical reconstruction with the minimum cost function is used to generate a predicted estimated sign of the predicted coefficient. When the number of predicted coefficients is N, 2N hypothetical reconstructions corresponding to each sign combination are generated using different sign combinations. Each hypothesis is evaluated based on the predefined cost function, and the hypothetical reconstruction with the minimum cost function is used to generate a predicted estimated sign combination of the predicted coefficients. A template-based sign prediction method is described in a WET proposal D0031. Firstly, n non-zero coefficients are selected from a coefficient block for sign prediction, and a corresponding template is calculated for the n coefficients. The template generation method involves performing an inverse transform operation on a block where each coefficient is used as a unique non-zero coefficient, and then using leftmost and topmost boundary values as a template corresponding to the coefficients. Table 1 shows a template corresponding to n=3 as below:

TABLE 1

| Template name | Generation method |
|---|---|
| T001 | inv xform single + ve for first sign predicted coefficient |
| T002 | inv xform single + ve for second sign predicted coefficient |
| T003 | inv xform single + ve for third sign predicted coefficient |

Firstly, a single inverse transform operation is performed on the inverse quantization coefficient, and signs of all predicted coefficients are set to positive. The prediction for the current block corresponds to a boundary reconstruction based on a first hypothesis. A first hypothetical reconstruction and the template are further used to construct the remaining 2n−1 hypotheses, and a calculation method is shown in Table 2:

TABLE 2

| Hypothesis | Generation method | Storage for reuse |
|---|---|---|
| H000 | inv xform for all coefficients | H000 |
| H001 | H000-2*T001 | |
| H010 | H000-2*T010 | H010 |
| H011 | H010-2*T001 | |
| H100 | H000-2*T100 | H100 |
| H101 | H100-2*T001 | |
| H110 | H100-2*T010 | H110 |
| H111 | H110-2*T001 | |

Figures 6, 7:
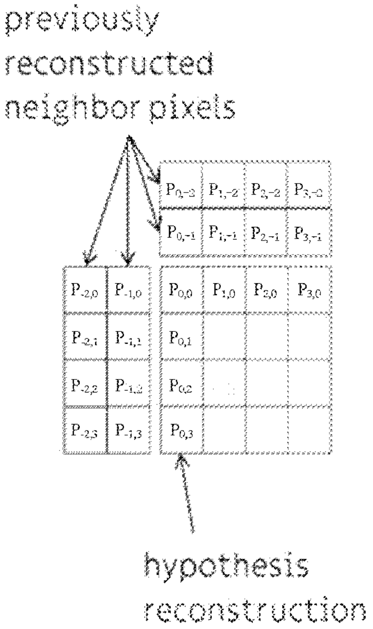
FIG. 6 is a schematic diagram of determining a predicted estimated sign according to the specific embodiment 1 of the present disclosure.
FIG. 7 is a schematic diagram of a scan order of coefficients for an 8*8 transform block according to a specific embodiment 2 of the present disclosure.

The cost function typically measures spatial discontinuity between previously reconstructed adjacent pixels and a hypothetical reconstruction using each hypothesis, as shown in FIG. 6. A sign combination closest to the hypothesis that minimizes the cost function is a predicted estimated sign.

In practical applications, in addition to the basic sign prediction method described above, various optimizations may also be performed based on the method. For example, when the cost function is calculated, only half of samples from a hypothetical reconstruction boundary are selected to reduce the computational load. Alternatively, when predicated coefficients are selected, certain conditions are added for limitations, thereby preferably selecting coefficients that are easy to predict or coefficients with sign errors having a relatively larger impact on results.

Step 4: Encode the coefficients of the current image block based on a result of the sign prediction process.

Coding the coefficients of the current image block includes coding absolute values of the coefficients of the current image block and coefficient signs of the current image block. Coding coefficient signs of the current image block further includes using a first coding method for the signs of the coefficients that are subjected to sign prediction to obtain a first coding result. The first coding method for the signs of the coefficients that are subjected to sign prediction may involve using the first coding method to code a sign prediction difference for the coefficients that are subjected to sign prediction. The sign prediction difference refers to a difference between the predicted sign and the original sign. For example, when an original sign of a coefficient is positive, if a predicted sign is also positive, that is, the sign prediction is correct, the sign prediction difference may be represented by "0". Conversely, if the predicted sign is negative, that is, the sign prediction is incorrect, the sign prediction difference may be represented by "1".

A second coding method may be adopted for signs of the remaining coefficients, excluding the predicted coefficients, to obtain a second coding result. The first coding method and the second coding method may be the same or different. In this step, conventional coding methods such as CABAC coding and bypass coding may be used for the first coding method and the second coding method.

Step 5: Add the coding result to a sub-bitstream corresponding to the sub-bitstream type.

The coding result at least includes the first coding result and/or the second coding result.

It should be noted that in this embodiment, different types of coding layer sub-bitstreams for the same image block can correspond to different sign prediction parameters, meanwhile, the sign prediction method may also be applied to only some coding layer sub-bitstreams, while the remaining coding layer sub-bitstreams do not adopt the sign prediction method. For example, the sign prediction method is only applied to the base layer sub-bitstream, and not applied to the enhancement layer sub-bitstream. In addition, the order of step 1 and step 2 is not completely fixed. It is also possible to first perform step 2 that "determine a currently coded sub-bitstream type and obtain sign prediction parameters corresponding to the sub-bitstream type", and then perform step 1 that "determine to perform sign prediction on coefficients of a current image block".

Further, the sign prediction parameters are also related to the sign prediction method used. The solution does not limit the specific sign prediction method. In addition to the sign prediction methods exemplified in this embodiment, a neural network-based sign prediction method or other sign prediction methods optimized based on the sign prediction method described in this embodiment may also be adopted.

Specific Embodiment 2

In the description related to FIG. 1, a scan order of transform coefficients for a typical 8*8 image block is introduced. The transform coefficients are further quantized, scanned in a Z-shaped order, and then coded. The arrangement method helps to place low-frequency non-zero coefficients before high-frequency coefficients. In the related art, a method for rearranging transform coefficients and then performing layered coding is also provided. As shown in FIG. 7, that there is one base layer and three enhancement layers is used as an example for illustration, four coefficients at an upper left corner may be coded as data for the base layer; the remaining twelve coefficients from sixteen coefficients at the upper left corner, excluding the four coefficients in the base layer, are coded as data for a first enhancement layer; coefficients 17-48 are coded as data for a second enhancement layer; and the remaining sixteen coefficients at a lower right corner are coded as data for a third enhancement layer.

The above is merely an example for illustration. In practical applications, a corresponding relationship between different coding layers and coefficients may be flexibly adjusted and optimized. For example, the first sixteen coefficients may also be coded as data for the base layer, coefficients 17-32 are coded as data for the first enhancement layer, the remaining thirty-two coefficients are coded as data for the second enhancement layer, and so on.

Figure 8:
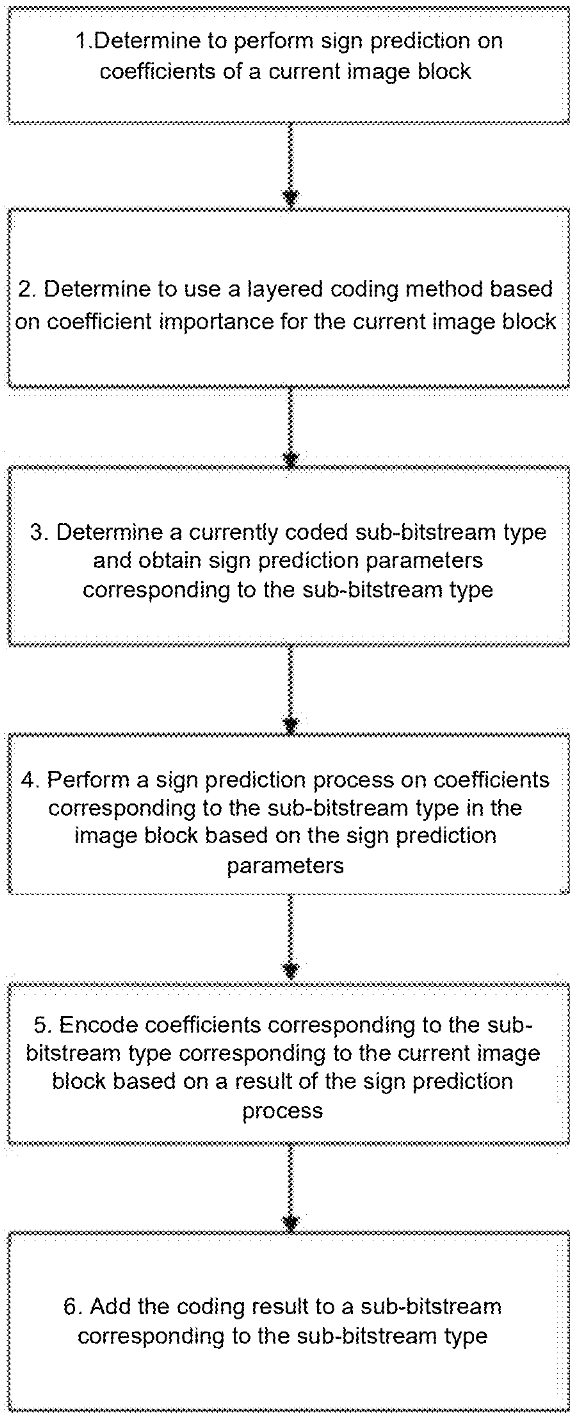
FIG. 8 is a flowchart of coding according to the specific embodiment 2 of the present disclosure.

According to the above layered coding principle based on the coefficient importance, this embodiment provides another example of predicting signs of transform coefficients in a layered coding video bitstream, as specifically shown in FIG. 8. The following steps are included:

Step 1: Determine to perform sign prediction on coefficients of a current image block.

This step is the same as step 1 in the specific embodiment 1.

Step 2: Determine to adopt a layered coding method based on coefficient importance for the current image block.

The layered coding method based on the coefficient importance refers to rearranging coefficients of an image block to achieve layered coding. Determining to adopt a layered coding method based on coefficient importance for the current image block includes, but is not limited to: determining based on a local configuration of an encoder; or determining based on features of the current image block or the image block; or determining based on a video sequence where the current image block is located; or determining based on a known decoder capability or configuration for a coded bitstream to be received; or determining based on an adopted dependent enhancement layer coding method; or determining based on other indicative information, where the other indicative information may come from a transmitting terminal of an uncoded image or a receiving terminal of a coded image.

Step 3: Determine a currently coded sub-bitstream type and obtain sign prediction parameters corresponding to the sub-bitstream type.

Reference is made to step 2 in the specific embodiment 1.

It should be noted that the order of step 2 and step 3 is not strictly fixed. It is also possible to first perform step 3 that "determine a currently coded sub-bitstream type and obtain sign prediction parameters corresponding to the sub-bitstream type", and then perform step 2 that "determine to adopt a layered coding method based on coefficient importance for the current image block". In addition, after determining to adopt the layered coding method based on the coefficient importance, the currently coded sub-bitstream type may only be a base layer sub-bitstream or a dependent enhancement layer sub-bitstream.

Step 4: Perform a sign prediction process on coefficients corresponding to the sub-bitstream type in the image block based on the sign prediction parameters.

For the specific prediction process, reference may be made to step 3 in the specific embodiment 1.

As mentioned earlier, the layered coding method based on the coefficient importance rearranges the transform coefficients of the current image block, and the rearranged coefficients are respectively coded as coefficients of different coding layers according to locations. The coefficients corresponding to the sub-bitstream type refer to a part of the coefficients corresponding to the image block. Coefficients corresponding to all sub-bitstream types are combined to form a complete coefficient corresponding to the image block.

Step 5: Code coefficients of the sub-bitstream type corresponding to the current image block based on a result of the sign prediction process.

Reference is made to step 4 in the specific embodiment 1.

Step 6: Add the coding result to a sub-bitstream corresponding to the sub-bitstream type.

When the sub-bitstream type is an enhancement layer sub-bitstream, if the enhancement layer sub-bitstream is a dependent enhancement layer sub-bitstream, the dependent enhancement layer sub-bitstream needs to be decoded together with the base layer sub-bitstream to provide a higher-quality video image. Therefore, an identifier needs to be added to the sub-bitstream to indicate that the sub-bitstream type is the dependent enhancement layer sub-bitstream.

When the layered coding method based on the coefficient importance is used, the sub-bitstream may also include an extraction decoding metadata mode flag bit, which is used to indicate that the decoding terminal needs to buffer or store decoding metadata for decoding a subsequent enhanced layer sub-bitstream when decoding a non-highest enhancement layer sub-bitstream or a reference layer sub-bitstream and may also be used to indicate that the decoding terminal obtains decoding metadata of the reference layer sub-bitstream that the enhancement layer sub-bitstream depends on when decoding the enhancement layer sub-bitstream. The decoding metadata includes, but is not limited to, an inverse transform coefficient or an inverse quantization coefficient.

The extraction decoding metadata mode flag bit may also be replaced by a coefficient-based layered coding flag bit, which is used to indicate that the decoding terminal needs to buffer or store decoding metadata for decoding a subsequent enhancement layer sub-bitstream when decoding a non-highest enhancement layer sub-bitstream or a reference layer sub-bitstream, and may also be used to indicate that the decoding terminal obtains decoding metadata of the reference layer sub-bitstream that the enhancement layer sub-bitstream depends on when decoding the enhancement layer sub-bitstream. The decoding metadata includes, but is not limited to, an inverse transform coefficient or an inverse quantization coefficient. The extraction decoding metadata mode flag bit mentioned in the following description and the coefficient-based layered coding flag bit are equivalent in function.

The sign prediction method in this embodiment may also be replaced with other sign processing methods, including but not limited to the sign bit hiding method.

Specific Embodiment 3

Figure 9:
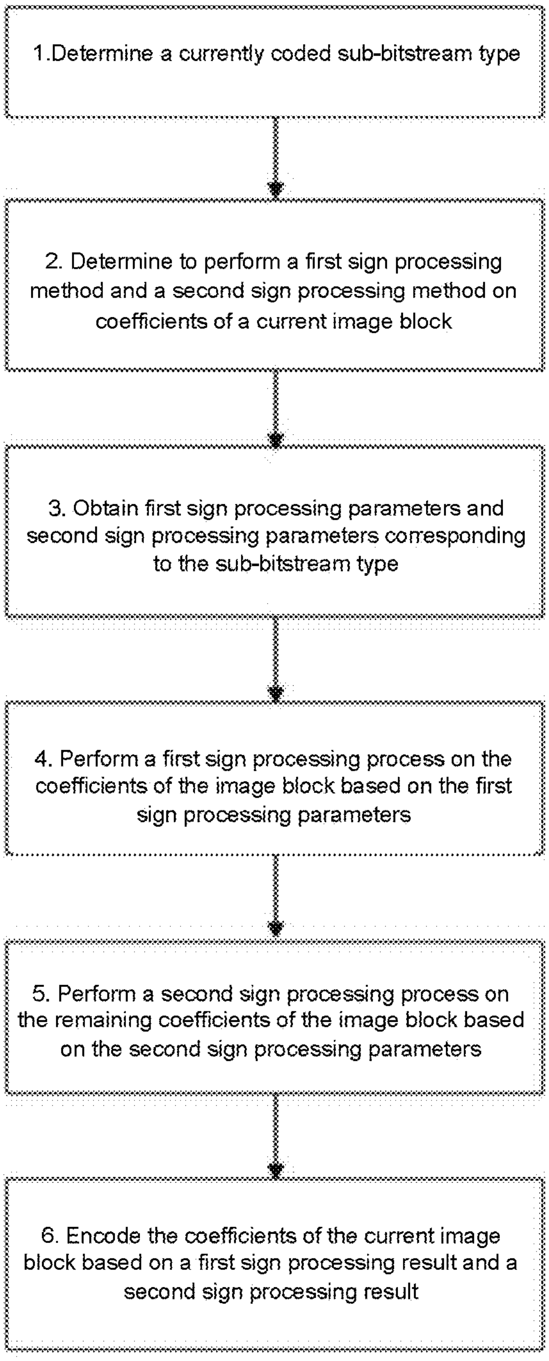
FIG. 9 is a flowchart of coding according to a specific embodiment 3 of the present disclosure.

This embodiment provides a method for processing signs of coding coefficients in a layered coding video bitstream, as specifically shown in FIG. 9. The following steps are included:

Step 1: Determine a currently coded sub-bitstream type.

The currently coded sub-bitstream type includes, but is not limited to, a base layer sub-bitstream and an enhancement layer sub-bitstream, where the enhancement layer sub-bitstream may further include an independent enhancement layer sub-bitstream or a dependent enhancement layer sub-bitstream. The sub-bitstream type corresponds to a layer identifier of the sub-bitstream.

Step 2: Determine to perform a first sign processing method and a second sign processing method on coefficients of a current image block.

The first sign processing method refers to a method that the coefficients of the image block are first selected for sign processing, and the second sign processing method refers to a method for performing sign processing on the remaining coefficients in addition to the coefficients selected in the first sign processing method.

The first sign processing method and the second sign processing method include, but are not limited to, any combination of a sign prediction method and a sign bit hiding method. The video encoder may determine to perform first sign processing and second sign processing on the coefficients of the current block based on certain conditions. These conditions may be features of the current image block, such as a size of the block, the distribution of corresponding coefficients, the number of non-zero coefficients, a prediction mode, a transform method, and information about adjacent image blocks. In addition, whether to allow the two sign processing methods to be performed may also be judged by obtaining a local configuration file, and whether to perform first sign processing and second sign processing on the current image block may also be determined based on a currently coded sub-bitstream type.

Methods for determining the first sign processing method and the second sign processing method include, but are not limited to: determining based on configuration information; determining based on priorities corresponding to the two sign processing methods; adaptively determining based on features of the above image block; adaptively determining based on features of an image where the current image block is located and/or a sequence where the image with the current image block is located; and determining based on a calculation result of a cost function or a rate-distortion function.

The sign prediction method in the related art has been described in the foregoing embodiments. For the completeness of the solution description, the sign bit hiding method is supplemented here. Sign bit hiding refers to the ability to infer a sign of a coefficient with a hidden sign based on a predetermined rule. Typically, the predetermined rule may be a predetermined check function. For a given coefficient set, a value of the sign of the coefficient with the hidden sign corresponds to a value of the check function of the coefficient set. For example, by calculating the sum of absolute values of all non-zero transform coefficients in the coefficient set, parity judgment is performed on the sum of the absolute values, an even number indicates that an estimated sign of the coefficient with the hidden sign is positive, and an odd number indicates that the estimated sign of the coefficient with the hidden sign is negative. In practical applications, the coefficient with the hidden sign may be a first non-zero transform coefficient in the coefficient set, or may be selected through other rules. There may be one or more coefficients with hidden signs, and the prior art of sign bit hiding is not described extensively.

Step 3: Obtain first sign processing parameters and second sign processing parameters corresponding to the sub-bitstream type.

As described in step 1, the first sign processing method and the second sign processing method include, but are not limited to, any combination of a sign prediction method and a sign bit hiding method. Therefore, the first sign processing parameters and the second sign processing parameters also include, but are not limited to, any combination of sign prediction parameters and sign bit hiding parameters.

The sign prediction parameters may include, but are not limited to, the number of coefficients for sign prediction, and/or a maximum value of coefficients for sign prediction, and/or a method for sign prediction. The method for sign prediction includes, but is not limited to, a template generation method, a hypothetical reconstruction generation method, a cost function calculation method, etc.

The sign bit hiding parameters may include, but are not limited to, the number of coefficients for sign bit hiding, and/or a maximum value of coefficients for sign bit hiding, and/or a method for sign bit hiding.

For the same image block, first sign processing parameters or second sign processing parameters corresponding to different sub-bitstream types may be different or the same in the type and number of included parameters. The value of the same sign processing parameter from the first sign processing parameters or the second sign processing parameters corresponding to different sub-bitstream types may be different or the same.

Step 4: Perform a first sign processing process on the coefficients of the image block based on the first sign processing parameters.

That the first sign processing method is the sign prediction method is used as an example for illustration. In this case, the signs of the coefficients of the image block are predicted based on the sign prediction parameters, and for the sign prediction method, reference is made to the specific embodiment 1 or the specific embodiment 2.

Step 5: Perform a second sign processing process on the remaining coefficients of the image block based on the second sign processing parameters.

The remaining coefficients of the image block refer to the coefficients of the image block, excluding the coefficients that are subjected to the first sign processing in step 4.

Step 6: Encode the coefficients of the current image block based on a first sign processing result and a second sign processing result.

Coding the coefficients of the current image block includes coding absolute values of the coefficients of the current image block and coefficient signs of the current image block. Coding coefficient signs of the current image block further includes using a first coding method for the signs of the coefficients that are subjected to the first sign processing, using a second coding method for the signs of the coefficients that are subjected to the second sign processing, and using a third coding method for the signs of the remaining coefficients, excluding the coefficients that are subjected to the first sign processing and the second sign processing. The first coding method, the second coding method, and the third coding method may be the same or different.

As an illustrative example, the CABAC coding method may be used for the signs of the coefficients that are subjected to the first sign processing and the signs of the coefficients that are subjected to the second sign processing, and the bypass coding method may be used for the signs of the remaining coefficients in the current image block, excluding the coefficients that are subjected to the first sign processing and the second sign processing.

Further, the coding result is added to a sub-bitstream corresponding to the sub-bitstream type.

The sub-bitstream optionally includes one or more arbitrary combinations of first sign processing method indicative information, first sign processing parameter information, second sign processing method indicative information, and second sign processing parameter information. The first sign processing method indicative information may be a first sign processing method performing flag bit, and the second sign processing method indicative information may be a second sign processing method performing flag bit.

All the above parameter information or indicative information may be carried in any one or more of a video parameter set (VPS for short), a sequence parameter set (SPS for short), a picture parameter set (PPS for short), and an adaptive parameter set (APS for short), or may be carried in an SEI message, or may be carried in a bitstream in any other way.

It should be further noted that different sub-bitstream types in the same bitstream may respectively support the use of two sign processing methods, or only use one sign processing method, or does not use any sign processing method. This embodiment mainly illustrates the process of using the two sign processing methods. For using only one sign processing method, reference may be made to the description in the specific embodiment 1 or 2. Not using any sign processing method means that signs of all coefficients or non-zero coefficients are not processed and are separately subjected to bypass coding and transmitted.

Figure 10:
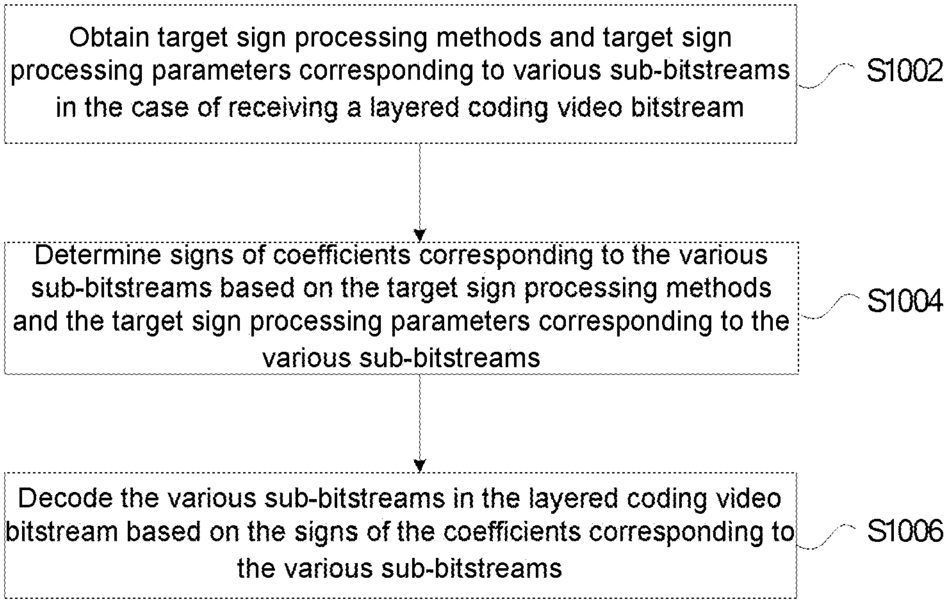
FIG. 10 is a flowchart of a decoding method according to an embodiment of the present disclosure.

The foregoing embodiments describe the processing at the coding terminal. Processing at the decoding terminal is described below:

The embodiments of the present disclosure further provide a decoding method, as shown in FIG. 10, including the following steps:

S1002: Obtain target sign processing methods and target sign processing parameters corresponding to various sub-bitstreams in the case of receiving a layered coding video bitstream.

S1004: Determine signs of coefficients corresponding to the various sub-bitstreams based on the target sign processing methods and the target sign processing parameters corresponding to the various sub-bitstreams.

S1006: Decode the various sub-bitstreams in the layered coding video bitstream based on the signs of the coefficients corresponding to the various sub-bitstreams.

The above operations may be performed by a decoding device (e.g., a video decoder), or a processor arranged within the decoding device, or a processor arranged separately from the decoding device, and of course, may also be performed by other devices with similar decoding capabilities.

In the above embodiment, the sub-bitstream of the layered coding (also known as scalable decoding) video bitstream includes, but is not limited to, a base layer sub-bitstream or an enhancement layer sub-bitstream, where the enhancement layer sub-bitstream may further include an independent enhancement layer sub-bitstream or a dependent enhancement layer sub-bitstream.

The above target sign processing method includes at least one of a sign prediction method, a sign bit hiding method, and other types of sign processing methods. It should be noted that when sign processing is performed on the coefficients of the image block, one sign processing method may be used to process the coefficients of the image block, or the plurality of sign processing methods may be used to process the coefficients of the image block. That is, one sign processing method is used to process some of the coefficients of the image block, the coefficients processed by the different sign processing methods are different, and the plurality of sign processing methods may have corresponding processing priorities, with the highest priority is performed first. In an optional embodiment, obtaining target sign processing parameters corresponding to various sub-bitstreams includes at least one of the following:

obtaining the target sign processing parameters from local configuration information;

obtaining the target sign processing parameters from the layered coding video bitstream or a target media file; and determining the target sign processing parameters based on parameter information included in the layered coding video bitstream.

It should be noted that the above several obtaining methods are merely exemplary illustrations, and in practical applications, there may also be other obtaining methods, such as obtaining target sign processing parameters sent by other devices.

In an optional embodiment, after decoding the various sub-bitstreams in the layered coding video bitstream based on the coefficients corresponding to the various sub-bitstreams and the signs of the coefficients, the method further includes: in the case of determining a currently decoded sub-bitstream as a reference layer sub-bitstream, storing a decoding result of the currently decoded sub-bitstream; or in the case of determining a currently decoded sub-bitstream as a reference layer sub-bitstream, storing decoding metadata of the currently decoded sub-bitstream. In this embodiment, the reference layer sub-bitstream may be a base layer sub-bitstream or a non-highest layer sub-bitstream. When the reference layer sub-bitstream is decoded, the decoding result or the decoding metadata of the reference layer sub-bitstream needs to be stored for decoding subsequent enhancement layer sub-bitstreams.

In an optional embodiment, obtaining target sign processing methods and target sign processing parameters corresponding to various sub-bitstreams includes: determining, based on a type of a currently coded sub-bitstream, a target sign processing method and target sign processing parameters corresponding to the currently coded sub-bitstream. It should be noted that various sub-bitstreams may have the same or different corresponding target sign processing methods and target sign processing parameters, and in addition, the various sub-bitstreams may also have the same corresponding target sign processing method and different parameters.

In an optional embodiment, the method further includes at least one of the following: obtaining indicative information carried in the layered coding video bitstream, and determining the type of the currently decoded sub-bitstream based on the indicative information; and obtaining identification information carried in the layered coding video bitstream, and performing, based on the identification information, at least one of the following operations: in the case of the currently decoded sub-bitstream is a reference layer sub-bitstream, storing a decoding result or decoding metadata of the currently decoded sub-bitstream for decoding a subsequent enhancement layer sub-bitstream; and in the case of the currently decoded sub-bitstream is an enhancement layer sub-bitstream, obtaining a decoding result or decoding metadata of a reference layer sub-bitstream that the enhancement layer sub-bitstream depends on.

In an optional embodiment, obtaining target sign processing methods and target sign processing parameters corresponding to various sub-bitstreams includes: obtaining a target quantity of sign processing methods corresponding to a currently decoded sub-bitstream; and determining, based on the target quantity, a target sign processing method and target sign processing parameters corresponding to the currently decoded sub-bitstream. In this embodiment, there may be one or more sign processing methods corresponding to the currently decoded sub-bitstream (i.e., a plurality of sign processing methods process coefficients of an image block). In the case that there are a plurality of sign processing methods corresponding to the currently decoded sub-bitstream, processing parameters corresponding to the methods need to be respectively obtained, and the sign processing parameters corresponding to the different sign processing methods may be the same or different.

In an optional embodiment, determining, based on the target quantity, a target sign processing method and target sign processing parameters corresponding to the currently decoded sub-bitstream includes:

in the case of the target quantity is 1, determining a target sign processing method and target sign processing parameters corresponding to the currently decoded sub-bitstream based on the type of the currently decoded sub-bitstream; and in the case of the target quantity is greater than 1, respectively determining each target sign processing method and corresponding target sign processing parameters, and a processing order of the target sign processing methods.

In this embodiment, the processing order of the target sign processing methods may be pre-configured, or may be determined based on a practical application scenario, and certainly, may also be default.

In an optional embodiment, determining the target sign processing method and the target sign processing parameters corresponding to the currently decoded sub-bitstream based on the type of the currently decoded sub-bitstream includes:

in the case of determining a currently decoded sub-bitstream as a dependent enhancement layer sub-bitstream, obtaining decoding metadata of a reference layer sub-bitstream of the currently decoded sub-bitstream included in the layered coding video bitstream, and determining coefficients of the currently decoded sub-bitstream and signs of the coefficients based on the decoding metadata of the reference layer sub-bitstream; and/or, in the case of determining a currently decoded sub-bitstream as a dependent enhancement layer sub-bitstream, obtaining a decoded image from stored reference images corresponding to the currently decoded sub-bitstream, and determining coefficients of the currently decoded sub-bitstream and signs of the coefficients based on the decoded image.

In an optional embodiment, determining signs of coefficients corresponding to the various sub-bitstreams based on the target sign processing methods and the target sign processing parameters corresponding to the various sub-bitstreams includes:

determining signs of first coefficients included in the currently decoded sub-bitstream based on sign prediction processing and sign prediction processing parameters, where the first coefficients are coefficients that are subjected to the sign prediction processing;

determining signs of second coefficients included in the currently decoded sub-bitstream based on sign bit hiding processing and sign bit hiding processing parameters, where the second coefficients are coefficients that are subjected to the sign bit hiding processing; and determining signs of third coefficients included in the currently decoded sub-bitstream, where the third coefficients are coefficients in the currently decoded sub-bitstream, excluding the first coefficients and the second coefficients.

It should be noted that the execution order of the above sign prediction processing and the sign bit hiding processing may be flexibly set. The sign prediction processing may be first performed, and then the sign bit hiding processing is performed. Alternatively, the sign bit hiding processing may be first performed, and then the sign prediction processing is performed. Of course, if supported, both the sign prediction processing and the sign bit hiding processing may be performed simultaneously.

The following is a specific description of the operation of a decoding terminal of the present disclosure in conjunction with the embodiments:

Specific Embodiment 4

Figure 11:
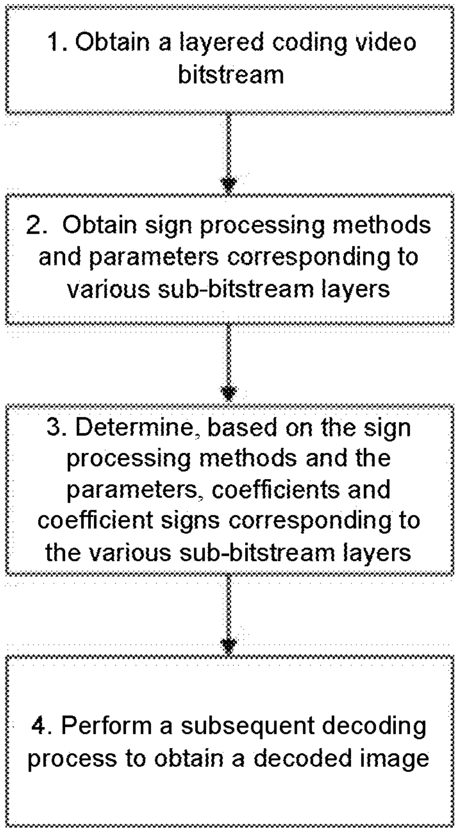
FIG. 11 is a flowchart of decoding according to a specific embodiment 4 of the present disclosure.

This embodiment provides a sign processing method for decoding a layered coding video bitstream, as shown in FIG. 11, including the following steps:

Step 1: Obtain a layered coding video bitstream.

The number of sub-bitstreams included in the layered coding video bitstream and layer identifiers corresponding to the sub-bitstreams may be determined based on the layered coding video bitstream.

The layered coding video bitstream should include one base layer sub-bitstream and at least one enhancement layer sub-bitstream. Therefore, the number of the sub-bitstreams should be greater than or equal to 2, and the enhancement layer sub-bitstream may be either an independent enhancement layer sub-bitstream or a dependent enhancement layer sub-bitstream. The base layer sub-bitstream may be independently decoded to provide basic-quality video content, and the independent enhancement layer sub-bitstream may be independently decoded to provide high-quality video content. The dependent enhancement layer sub-bitstream needs to be decoded together with the base layer sub-bitstream to provide high-quality video content.

Step 2: Obtain sign processing methods and sign processing parameters corresponding to various sub-bitstream layers.

The sign processing methods include, but are not limited to, a sign prediction method, a sign bit hiding method, and any combination thereof. The sign prediction parameters may include, but are not limited to, the number of coefficients for sign prediction, and/or a maximum value of coefficients for sign prediction, and/or a method for sign prediction. The method for sign prediction includes, but is not limited to, a template generation method, a hypothetical reconstruction generation method, a cost function calculation method, etc. The sign bit hiding parameters may include, but are not limited to, the number of coefficients for sign bit hiding, and/or a maximum value of coefficients for sign bit hiding, and/or a method for sign bit hiding. The sign processing parameters may be obtained from local configuration information, or may be obtained from bitstreams or media files. Alternatively, some sign processing parameters are obtained from the configuration information, and some sign processing parameters are obtained from the bitstreams. In addition, when the sign prediction method and the sign bit hiding method are simultaneously used, indicative information about an order of the sign prediction method and the sign bit hiding method may be further included.

It should be noted that the above sign processing parameter information may be directly obtained from the bitstream or the local configuration information. The local configuration information may be a predetermined rule agreed upon by both the coding terminal and the decoding terminal, or may be derived from other parameter information transmitted in the bitstream, or may be derived from both the parameter information transmitted in the bitstream and the local configuration information.

A certain sub-bitstream may be allowed not to adopt any sign processing method.

The sign processing method corresponding to each sub-bitstream layer may be further defined as a sign processing method corresponding to each image block of each sub-bitstream layer. Since in the actual decoding process, a decoder performs decoding block by block with an image block as the unit, it should be understood as the sign processing method corresponding to a currently decoded image block in a currently decoded sub-bitstream layer. All image blocks in the same sub-bitstream layer may have the same or different corresponding sign processing methods and the same or different numbers of sign processing methods, and further, all image blocks in the same frame of the same bitstream layer may have the same or different corresponding sign processing methods and the same or different numbers of sign processing methods. For ease of description of subsequent examples, it is still briefly described as the sign processing method corresponding to each sub-bitstream layer.

Step 3: Determine corresponding coefficients and signs thereof in the various sub-bitstreams based on the sign processing methods and corresponding sign parameters thereof.

Determining corresponding coefficients and signs thereof in each coding layer sub-bitstream may include the following two parts: determining coefficients that are subjected to sign processing and corresponding signs thereof based on the sign processing method and corresponding sign parameters thereof; and/or determining coefficients that are not subjected to sign processing and corresponding signs thereof. Based on different sign processing methods, the determining coefficients that are subjected to sign processing and corresponding signs thereof based on the sign processing method and corresponding sign parameters thereof may further include: determining coefficients that are subjected to sign prediction and corresponding signs thereof based on the sign prediction method and corresponding sign parameters thereof, and/or determining coefficients that are subjected to sign bit hiding and corresponding signs thereof based on the sign bit hiding method and corresponding sign parameters thereof. For details, reference is made to the descriptions of steps 3.1 and 3.2 in the specific embodiment 5.

Step 4: Perform a subsequent decoding process to obtain a decoded image.

It should be further noted that after performing step 4, the following operation may also need to be performed: storing a decoding result of a current sub-bitstream for subsequent reference by other sub-bitstream layers when a current sub-bitstream layer is determined as a reference layer. The decoding result may be a decoded image and/or decoded metadata. For details, reference is made to the description in the specific embodiment 5.

Specific Embodiment 5

Figure 12:
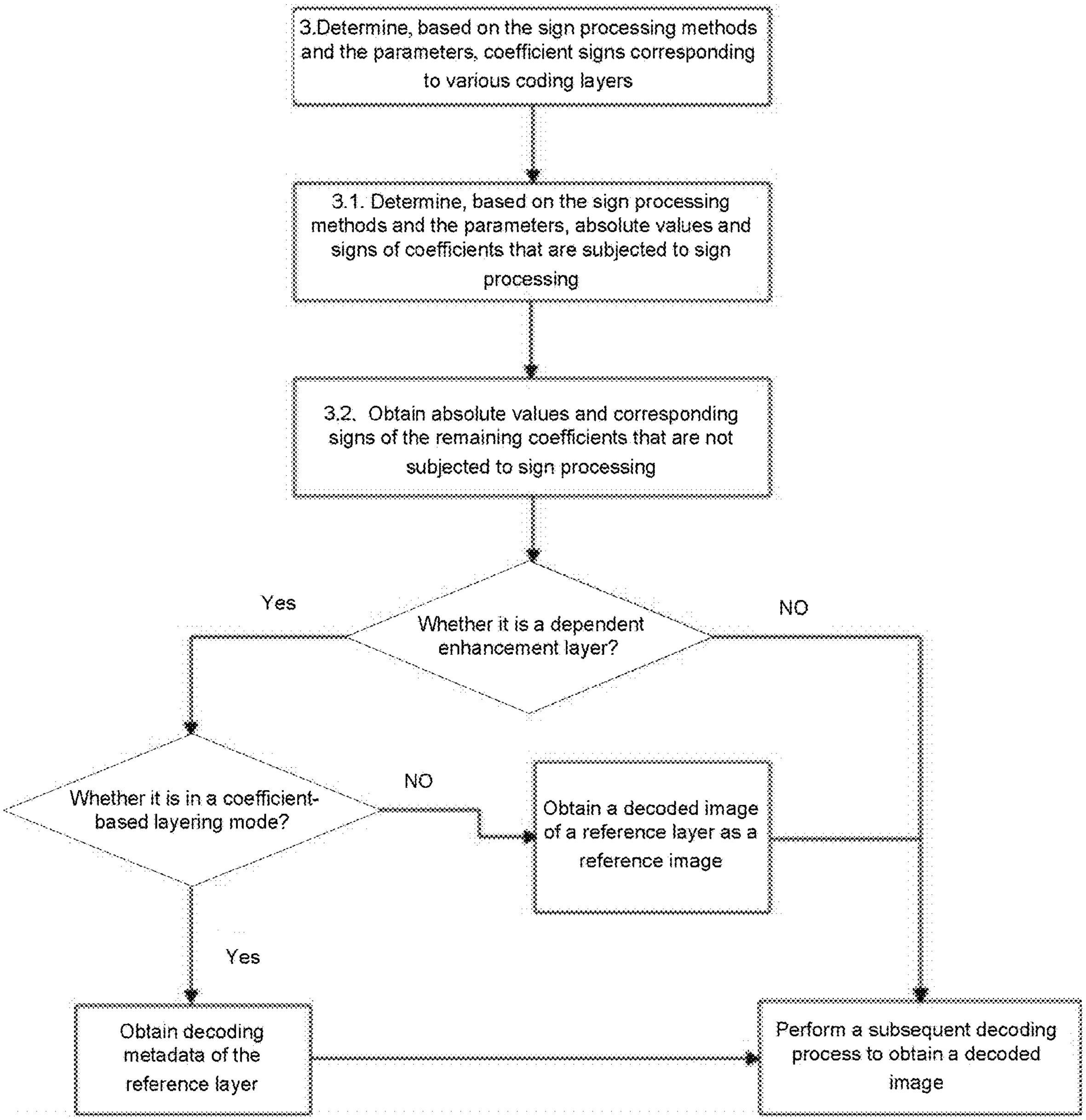
FIG. 12 is a flowchart of decoding according to a specific embodiment 5 of the present disclosure.

This embodiment provides an embodiment of substeps for step 3 that "determine corresponding coefficients and signs thereof in the various coding layer sub-bitstreams based on the sign processing methods and corresponding sign parameters thereof" in the specific embodiment 4, as shown in FIG. 12, including the following steps:

Step 3.1: Determine, based on the sign processing methods and parameters, absolute values and signs of coefficients that are subjected to sign processing.

When the sign processing method is a sign prediction method, coefficients with predicted signs and corresponding sign values thereof are determined based on the sign prediction parameters. The process may include the following steps: decoding a difference between an estimated sign and an original sign, performing a sign prediction process to obtain a predicted estimated sign, and correcting the predicted estimated sign based on the difference obtained through decoding to obtain a final sign. Taking n coefficients corresponding to the specific embodiment 1 as an example here, a specific example of the sign prediction process is provided. The video decoder may perform a single inverse transform operation on the inverse quantization coefficient, set signs of all predicted coefficients to positive, and the prediction for the current block corresponds to the boundary reconstruction of the first hypothesis. The decoder further calculates a corresponding template for the n coefficients. The template generation method involves performing an inverse transform operation on a block where each coefficient is used as a unique non-zero coefficient, and then using leftmost and topmost boundary values as a template corresponding to the coefficients. A plurality of hypotheses are constructed using the previously stored first hypothetical reconstruction and the template, and a sign combination closest to the hypothesis that minimizes the cost function is the predicted estimated sign.

When the sign processing method is a sign bit hiding method, the decoding terminal determines coefficients with hidden signs and corresponding sign values thereof based on the sign bit hiding parameters. The process may include the following steps:

- when the sign processing method includes both the sign prediction method and the sign bit hiding method, and the sign prediction method has a higher priority, the coefficients with predicted signs and corresponding sign values thereof are first determined based on sign prediction parameters, and coefficients with hidden signs and corresponding sign values thereof are determined from the remaining coefficients based on sign bit hiding parameters. Conversely, when the sign processing method includes both the sign prediction method and the sign bit hiding method, and the sign bit hiding method has a higher priority, the coefficients with hidden signs and corresponding sign values thereof are first determined based on sign bit hiding parameters, and coefficients with predicted signs and corresponding sign values thereof are determined from the remaining coefficients based on sign prediction parameters.

Step 3.2: Obtain absolute values and corresponding signs of the remaining coefficients that are not subjected to sign processing.

Coefficients obtained from a decoded bitstream, excluding the coefficients confirmed to be subjected to sign processing, are the remaining coefficients that are not subjected to sign processing. Typically, these coefficients are transmitted in the form of absolute values. Corresponding signs may be obtained from a bypass coded bitstream.

Step 3.3: Determine whether the current sub-bitstream is a dependent enhancement layer sub-bitstream, if yes, perform step 3.4, and if not, perform step 4.

Determining whether it is a dependent enhancement layer sub-bitstream is the prior art.

Step 3.4: Determine whether it is in a coefficient-based layered coding mode, if yes, perform step 3.6, and if not, perform step 3.5.

Determining whether it is in a coefficient-based layered coding mode may use any of the following methods: determining that the bitstream includes a flag bit of the coefficient-based layered coding mode, and when the flag bit is used for indicating that the decoder decodes the dependent enhancement layer sub-bitstream, decoding metadata of the base layer sub-bitstream and/or a low enhancement layer sub-bitstream needs to be extracted, and the decoding metadata of the base layer sub-bitstream and/or the low enhancement layer sub-bitstream should at least include the coding coefficients and the corresponding signs obtained in step 3.1 and step 3.2. The base layer sub-bitstream may be a sub-bitstream with a layer identifier (layer_id) equal to 0, and the low enhancement layer sub-bitstream may be a sub-bitstream with a layer identifier (layer_id) smaller than the layer identifier of the current sub-bitstream.

Step 3.5: Obtain a decoded image of a reference layer as a reference image.

The decoded image of the reference layer is usually cached in a decoded picture buffer (DPB) of the decoder, from which the decoder may obtain the decoded image referenced by a currently decoded sub-bitstream image.

Step 3.6: Obtain decoding metadata of a reference layer sub-bitstream.

The reference layer sub-bitstream includes a base layer sub-bitstream, namely a sub-bitstream with a layer identifier equal to 0, and/or a reference layer enhancement sub-bitstream, namely a sub-bitstream with a layer identifier less than the layer identifier of the current sub-bitstream. The sub-bitstream is a reference layer of the current sub-bitstream. Obtaining the decoding metadata of the reference layer sub-bitstream means obtaining absolute values and signs of the coefficients of the reference layer sub-bitstream, including but not limited to the absolute values of the coefficients and the corresponding signs obtained in step 3.1 and step 3.2.

Similarly, this embodiment may also require performing the following operations: further determining whether it is in the coefficient-based layered coding mode when determining that a current sub-bitstream layer is a reference layer, if it is in the coefficient-based layered coding mode, storing decoding metadata of a current sub-bitstream for subsequent reference by other sub-bitstream layers, and if it is not in the coefficient-based layered coding mode, storing a decoded image of the current sub-bitstream for subsequent reference by the other sub-bitstream layers.

Specific Embodiment 6

Figure 13:
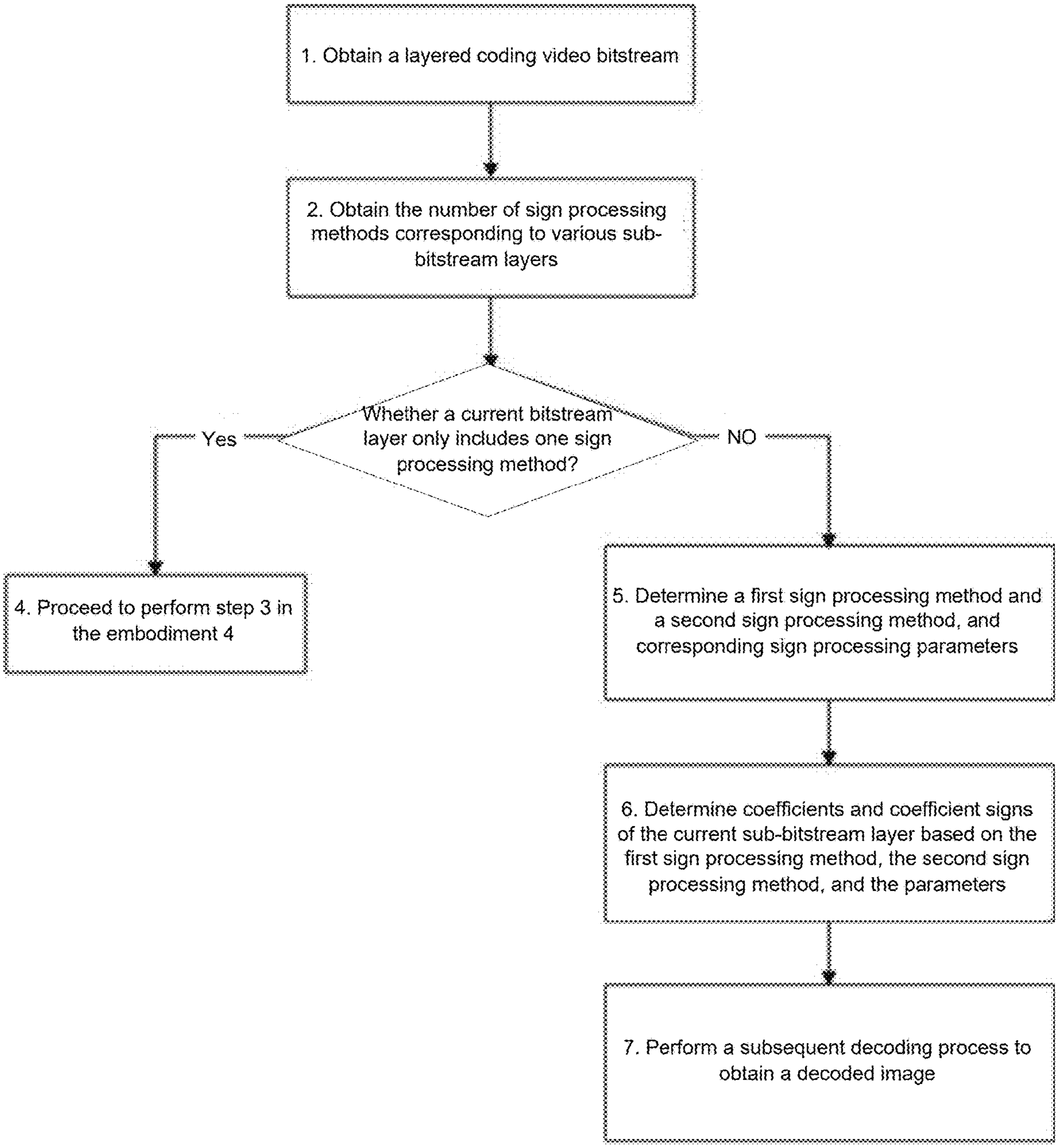
FIG. 13 is a flowchart of decoding according to a specific embodiment 6 of the present disclosure.

This embodiment provides another sign processing method for decoding a layered coding video bitstream. As shown in FIG. 13, the method includes the following steps:

Step 1: Obtain a layered coding video bitstream.

This step is the same as step 1 in the specific embodiment 4.

Step 2: Obtain the number of sign processing methods corresponding to various sub-bitstream layers.

Obtaining the number of sign processing methods corresponding to various sub-bitstream layers includes, but is not limited to: determining based on configuration information, where for example, the configuration information may indicate that the number of sign processing methods for sub-bitstreams other than a base layer is 1; or determining based on the number of sign processing methods indicated to be performed in a bitstream; or determining based on a maximum number of sign processing methods indicated in the bitstream and/or a media file, etc.

Step 3: Determine whether a current sub-bitstream layer only includes one sign processing method, if yes, perform step 4, and if not, perform step 5.

The decoding terminal selects a sub-bitstream layer that needs to be decoded currently, and further determines, based on the number of sign processing methods corresponding to each sub-bitstream layer obtained in step 2, whether the number of the sign processing methods corresponding to the current sub-bitstream layer is only one. It should be noted that the decoding terminal may also select the sub-bitstream layer that needs to be decoded currently as the current bitstream layer before step 2, and then determine the number of sign processing methods corresponding to the current bitstream layer.

Step 4: Proceed to perform step 3 in the specific embodiment 4.

Reference is made to step 3 in the specific embodiment 4.

Step 5: Determine a first sign processing method and a second sign processing method, and corresponding sign processing parameters.

Reference is made to step 3 in the specific embodiment 3, and the first sign processing method and the second sign processing method include, but are not limited to, any combination of a sign prediction method and a sign bit hiding method. Therefore, first sign processing parameters and second sign processing parameters also include, but are not limited to, any combination of sign prediction parameters and sign bit hiding parameters.

The sign prediction parameters may include, but are not limited to, the number of coefficients for sign prediction, and/or a maximum value of coefficients for sign prediction, and/or a method for sign prediction. The method for sign prediction includes, but is not limited to, a template generation method, a hypothetical reconstruction generation method, a cost function calculation method, etc. The sign bit hiding parameters may include, but are not limited to, the number of coefficients for sign bit hiding, and/or a maximum value of coefficients for sign bit hiding, and/or a method for sign bit hiding. The sign processing parameters may be obtained from local configuration information, or may be obtained from bitstreams or media files. Alternatively, some sign processing parameters are obtained from the configuration information, and some sign processing parameters are obtained from the bitstreams.

For the same image block, first sign processing parameters or second sign processing parameters corresponding to different sub-bitstream layers may be different or the same in the type and number of included parameters. The value of the same sign processing parameter from the first sign processing parameters or the second sign processing parameters corresponding to different sub-bitstream types may be different or the same.

For the same bitstream layer, first sign processing parameters or second sign processing parameters corresponding to different image blocks may be different or the same in the type and number of included parameters. The value of the same sign processing parameter from the first sign processing parameters or the second sign processing parameters corresponding to different sub-bitstream types may be different or the same.

Step 6: Determine coefficients and coefficient signs of the current sub-bitstream layer based on the first sign processing method, the second sign processing method, and the parameters.

Determining coefficients and coefficient signs of the current sub-bitstream layer may further include the following steps: determining first coefficients and corresponding signs of the current sub-bitstream layer based on the first sign processing method and the parameters thereof; determining second coefficients and corresponding signs of the current sub-bitstream layer based on the second sign processing method and the parameters thereof; and determining remaining third coefficients and corresponding signs, excluding the coefficients that are subjected to first sign processing and second sign processing.

The coefficients and the coefficient signs of the current sub-bitstream layer include the first coefficients and the signs thereof, the second coefficients and the signs thereof, and the third coefficients and the signs thereof. The first coefficients, the second coefficients, and the third coefficients may respectively include an absolute value of one or more absolute values.

Step 7: Perform a subsequent decoding process to obtain a decoded image.

Reference is made to step 4 in the specific embodiment 4.

According to the descriptions in the foregoing implementations, those skilled in the art can clearly know that the method according to the foregoing embodiments may be implemented by software and a necessary general-purpose hardware platform, and certainly may also be implemented by hardware, but the former is a preferred implementation in many cases. Based on such understanding, the technical solution of the present disclosure essentially or parts making contribution to the prior art may be embodied in the form of a software product. A computer software product is stored in a storage medium (e.g., a ROM/RAM, a disk, and a compact disc), which includes a plurality of instructions used for enabling one terminal device (e.g., a mobile phone, a computer, a server, or a network device) to perform the method according to various embodiments of the present disclosure.

In this embodiment, a coding apparatus and a decoding apparatus are further provided. The apparatuses are respectively used to implement the above coding embodiments and preferred implementations, and the decoding embodiments and the preferred implementations, and details that have been described are not repeated. The term "module" used as below may implement combination of software and/or hardware with preset functions. Apparatuses described in the following embodiments are preferably implemented by the software, but it is possible and conceivable for implementing the apparatuses through the hardware or combination of the software and the hardware.

Figure 14:
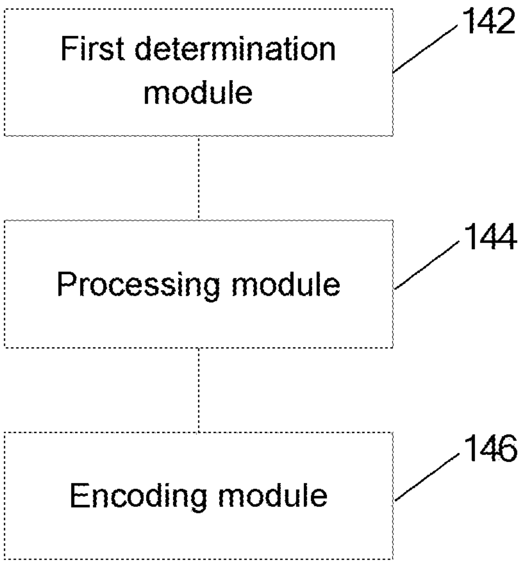
FIG. 14 is a structural block diagram of a coding apparatus according to an embodiment of the present disclosure.

FIG. 14 is a structural block diagram of a coding apparatus according to an embodiment of the present disclosure. As shown in FIG. 14, the apparatus includes:

a first determination module 142, configured to determine a target type of a currently coded target sub-bitstream, and a target sign processing method and target sign processing parameters corresponding to the target type;

a processing module 144, configured to perform target sign processing on coefficients of a current image block based on the target sign processing parameters and the target sign processing method; and an encoding module 146, configured to encode the coefficients of the current image block based on a processing result of the target sign processing.

In an optional embodiment, the apparatus further includes a third determination module, configured to determine, before performing target sign processing on coefficients of a current image block based on the target sign processing parameters and the target sign processing method, the need for the target sign processing on the coefficients of the current image block based on a first condition, where the first condition includes at least one of the following: a feature size of the current image block, a distribution state of the coefficients of the current image block, the number of non-zero coefficients in the current image block, a processing mode of the target sign processing, a transform method, feature information of other image blocks adjacent to the current image block, local configuration information, the target type of the target sub-bitstream, priorities of a plurality of sign processing methods, features of an image where the current image block is located, features of a sequence where the image with the current image block is located, and a calculation result of a cost function or a rate-distortion function.

In an optional embodiment, the encoding module 146 includes: a first coding unit, configured to respectively code coefficients that are subjected to the target sign processing and coefficients that are not subjected to the target sign processing in the current image block, where a coding method for coding the coefficients that are subjected to the target sign processing may be the same as or different from a coding method for coding the coefficients that are not subjected to the target sign processing. The target sign processing method includes one or more processing methods. When the target sign processing method includes one processing method, one coding method is used to encode the coefficients in the current image block that are subjected to the target sign processing. When the target sign processing method includes a plurality of processing methods, the coefficients in the current image block that are subjected to the target sign processing based on different target sign processing methods are coded respectively, and coding methods for the coefficients that are subjected to the target sign processing based on the different target sign processing methods may be the same or different from each other.

In an optional embodiment, the encoding module 146 includes: a first determination unit, configured to determine a difference between a predicted sign and an original sign of a coefficient based on a processing result of the sign prediction processing when the target sign processing method includes a sign prediction processing method; and a second coding unit, configured to code the difference based on a coding method corresponding to the sign prediction processing method.

In an optional embodiment, the apparatus further includes: a first adding module, configured to add, after coding the coefficients of the current image block based on the processing result of the target sign processing, the coding result to the target sub-bitstream.

In an optional embodiment, the apparatus further includes: a fourth determination module, configured to determine, before coding the coefficients of the current image block based on the processing result of the target sign processing, the need to encode the coefficients of the current image block according to a layered coding method based on coefficient importance.

In an optional embodiment, the fourth determination module includes: a second determination unit, configured to determine the need to encode the coefficients of the current image block according to a layered coding method based on coefficient importance using at least one of the following methods:

determining based on a local configuration of an encoder, determining based on features of the current image block, determining based on a video sequence where the current image block is located, determining based on a known decoder capability or configuration for a coded bitstream to be received, determining based on an adopted dependent enhancement layer coding method, and determining based on received indicative information, where the indicative information comes from a transmitting terminal of an uncoded image or a receiving terminal of a coded image.

In an optional embodiment, the apparatus further includes: a sorting module, configured to reorder the coefficients of the current image block based on coefficient importance; and a fifth determination module, configured to determine a coding layer to which each coefficient belongs based on a position of each reordered coefficient of the current image block.

In an optional embodiment, the apparatus further includes a second adding module, configured to perform, after coding the coefficients of the current image block based on a processing result of the target sign processing, one of the following operations:

adding indicative information used to indicate the type of the target sub-bitstream to the target sub-bitstream; and adding identification information to the target sub-bitstream, where the identification information is used to indicate at least one of the following: when decoding a reference layer sub-bitstream, the decoding terminal needs to store a decoding result or decoding metadata for decoding a subsequent enhancement layer sub-bitstream; and when decoding the enhancement layer sub-bitstream, the decoding terminal obtains a decoding result or decoding metadata of the reference layer sub-bitstream that the enhancement layer sub-bitstream depends on.

In an optional embodiment, the target sign processing includes one of the following processing: sign prediction processing and sign bit hiding processing.

Figure 15:
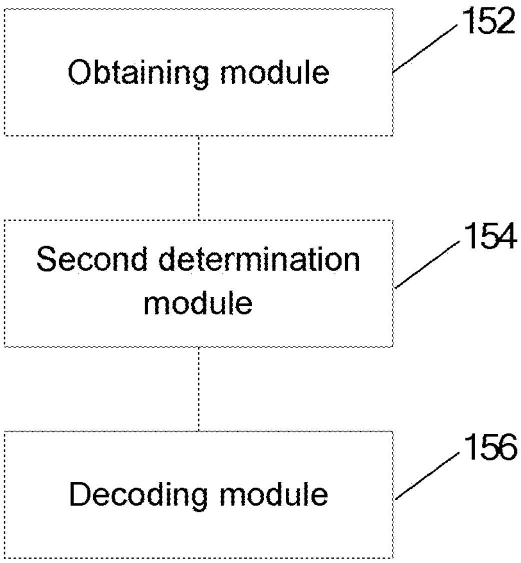
FIG. 15 is a structural block diagram of a decoding apparatus according to an embodiment of the present disclosure.

FIG. 15 is a structural block diagram of a decoding apparatus according to an embodiment of the present disclosure. As shown in FIG. 15, the apparatus includes:

an obtaining module 152, configured to obtain target sign processing methods and target sign processing parameters corresponding to various sub-bitstreams in the case of receiving a layered coding video bitstream;

a second determination module 154, configured to determine signs of coefficients corresponding to the various sub-bitstreams based on the target sign processing methods and the target sign processing parameters corresponding to the various sub-bitstreams; and a decoding module 156, configured to decode the various sub-bitstreams in the layered coding video bitstream based on the signs of the coefficients corresponding to the various sub-bitstreams.

In an optional embodiment, the obtaining module 152 includes at least one of the following:

a first obtaining unit, configured to obtain the target sign processing parameters from local configuration information;

a second obtaining unit, configured to obtain the target sign processing parameters from the layered coding video bitstream or a target media file; and a third obtaining unit, configured to determine the target sign processing parameters based on parameter information included in the layered coding video bitstream.

In an optional embodiment, the apparatus further includes a storage module, configured to store, in the case of determining a currently decoded sub-bitstream as a reference layer sub-bitstream, a decoding result of the currently decoded sub-bitstream after decoding various sub-bitstreams in the layered coding video bitstream based on coefficients corresponding to the various sub-bitstreams and signs of the coefficients; or store, in the case of determining a currently decoded sub-bitstream as a reference layer sub-bitstream, decoding metadata of the currently decoded sub-bitstream.

In an optional embodiment, the obtaining module 152 includes: a third determination unit, configured to determine a target sign processing method and target sign processing parameters corresponding to the currently decoded sub-bitstream based on the type of the currently decoded sub-bitstream.

In an optional embodiment, the apparatus further includes at least one of the following:

a sixth determination module, configured to obtain indicative information carried in the layered coding video bitstream, and determine the type of the currently decoded sub-bitstream based on the indicative information; and a processing module, configured to obtain identification information carried in the layered coding video bitstream, and perform, based on the identification information, at least one of the following operations: in the case of the currently decoded sub-bitstream is a reference layer sub-bitstream, storing a decoding result or decoding metadata of the currently decoded sub-bitstream for decoding a subsequent enhancement layer sub-bitstream; and in the case of the currently decoded sub-bitstream is an enhancement layer sub-bitstream, obtaining a decoding result or decoding metadata of a reference layer sub-bitstream that the enhancement layer sub-bitstream depends on.

In an optional embodiment, the obtaining module 152 includes: a fourth obtaining unit, configured to obtain a target quantity of sign processing methods corresponding to a currently decoded sub-bitstream; and a fourth determination unit, configured to determine, based on the target quantity, a target sign processing method and target sign processing parameters corresponding to the currently decoded sub-bitstream.

In an optional embodiment, the fourth determination unit includes: a first determination subunit, configured to determine, in the case of the target quantity is 1, a target sign processing method and target sign processing parameters corresponding to the currently decoded sub-bitstream based on the type of the currently decoded sub-bitstream; and a second determination subunit, configured to respectively determine, in the case of the target quantity is greater than 1, each target sign processing method and corresponding target sign processing parameters, and a processing order of the target sign processing methods.

In an optional embodiment, both the third determination unit and the first determination subunit determine, based on the type of the currently decoded sub-bitstream, the target sign processing method and the target sign processing parameters corresponding to the currently decoded sub-bitstream through the following method: in the case of determining a currently decoded sub-bitstream as a dependent enhancement layer sub-bitstream, obtaining decoding metadata of a reference layer sub-bitstream of the currently decoded sub-bitstream included in the layered coding video bitstream, and determining coefficients of the currently decoded sub-bitstream and signs of the coefficients based on the decoding metadata of the reference layer sub-bitstream; and/or, in the case of determining a currently decoded sub-bitstream as a dependent enhancement layer sub-bitstream, obtaining a decoded image from stored reference images corresponding to the currently decoded sub-bitstream, and determining coefficients of the currently decoded sub-bitstream and signs of the coefficients based on the decoded image.

In an optional embodiment, the second determination module 154 includes: a fifth determination unit, configured to determine signs of first coefficients included in the currently decoded sub-bitstream based on sign prediction processing and sign prediction processing parameters, where the first coefficients are coefficients that are subjected to the sign prediction processing; a sixth determination unit, configured to determine signs of second coefficients included in the currently decoded sub-bitstream based on sign bit hiding processing and sign bit hiding processing parameters, where the second coefficients are coefficients that are subjected to the sign bit hiding processing; and a sixth determination unit, configured to determine signs of third coefficients included in the currently decoded sub-bitstream, where the third coefficients are coefficients in the currently decoded sub-bitstream, excluding the first coefficients and the second coefficients.

It should be noted that the above modules may be implemented through software or hardware, and for the latter, the modules may be implemented by following methods including but not limited to: the above modules are all located in the same processor; or the above modules are respectively located in different processors in the form of any combination.

The embodiments of the present disclosure further provide a computer-readable storage medium having a computer program stored therein, where the computer program is configured to perform the steps in any one of the above method embodiments when operated.

In an exemplary embodiment, the above computer-readable storage medium may include, but is not limited to: a U disk, a read-only memory (ROM for short), a random access memory (RAM for short), a mobile hard disk, a magnetic disk, a compact disc, or other media capable of storing computer programs.

The embodiments of the present disclosure further provide an electronic apparatus including a memory and a processor. The memory has a computer program stored therein, and the processor is configured to run the computer program so as to perform the steps in any one of the above method embodiments.

In an exemplary embodiment, the above electronic apparatus may further include a transmission device and an input and output device. The transmission device is connected with the above processor, and the input and output device is connected with the above processor.

For specific examples in this embodiment, reference may be made to the examples described in the above embodiments and exemplary implementations, which will not be described in detail in this embodiment.

Obviously, those skilled in the art should understand that the modules or steps in the embodiments of the present disclosure may be implemented through a general-purpose computing device, which may be centralized on a single computing device or distributed over a network formed by a plurality of computing devices, and may be implemented by executable program code of the computing device, such that the modules or steps may be stored in a storage apparatus to be performed by the computing device; and in some cases, the shown or described steps may be performed in a different order than presented here, or the modules or steps may be made into various integrated circuit modules, or more of the modules or steps may be made into a single integrated circuit module to be implemented. Therefore, the present disclosure is not limited to any specific hardware and software combination.

The foregoing descriptions are merely preferred embodiments of the present disclosure, but are not intended to limit the present disclosure. Those skilled in the art may make various modifications and variations to the present disclosure. Any modification, equivalent replacement, improvement, etc., made within the principle of the present disclosure shall fall within the scope of protection of the present disclosure.

What is claimed is:

1. A coding method, comprising:

determining a target type of a currently coded target sub-bitstream, and a target sign processing method and target sign processing parameters corresponding to the target type;

performing target sign processing on a coefficient of a current image block based on the target sign processing parameters and the target sign processing method; and encoding the coefficient of the current image block based on a processing result of the target sign processing;

wherein the target type comprises at least one of a base layer sub-bitstream or an enhancement layer sub-bitstream.

2. The method according to claim 1, wherein before the performing target sign processing on the coefficient of a current image block based on the target sign processing parameters and the target sign processing method, the method further comprises:

determining the need for the target sign processing on the coefficient of the current image block based on a first condition, wherein the first condition comprises at least one of the following:

a feature size of the current image block, a distribution state of the coefficient of the current image block, number of non-zero coefficients in the current image block, a processing mode of the target sign processing, a transform method, feature information of other image blocks adjacent to the current image block, local configuration information, the target type of the target sub-bitstream, priorities of a plurality of sign processing methods, features of an image where the current image block is located, features of a sequence where the image with the current image block is located, and a calculation result of a cost function or a rate-distortion function.

3. The method according to claim 1, wherein the coding the coefficient of the current image block based on a processing result of the target sign processing comprises:

respectively encoding a coefficient that is subjected to the target sign processing and a coefficient that is not subjected to the target sign processing in the current image block, wherein a coding method for coding the coefficient that is not subjected to the target sign processing is the same as or different from a coding method for coding the coefficient that is not subjected to the target sign processing;

the target sign processing method comprises one or more processing methods; when the target sign processing method comprises one processing method, one coding method is used to encode the coefficient in the current image block that is subjected to the target sign processing; and when the target sign processing method comprises a plurality of processing methods, the coefficients in the current image block that are subjected to the target sign processing based on different target sign processing methods are coded respectively, and coding methods for the coefficients that are subjected to the target sign processing based on the different target sign processing methods are the same or different from each other.

4. The method according to claim 3, wherein the coding the coefficients of the current image block based on a processing result of the target sign processing comprises:

determining a difference between a predicted sign and an original sign of a coefficient based on a processing result of the sign prediction processing when the target sign processing method comprises a sign prediction processing method; and encoding the difference based on a coding method corresponding to the sign prediction processing method.

5. The method according to claim 1, wherein after the coding the coefficient of the current image block based on a processing result of the target sign processing, the method further comprises:

adding the coding result to the target sub-bitstream.

6. The method according to claim 1, wherein after the coding the coefficient of the current image block based on a processing result of the target sign processing, the method further comprises:

determining the need to encode the coefficients of the current image block according to a layered coding method based on coefficient importance.

7. The method according to claim 6, wherein the determining the need to code the coefficient of the current image block according to a layered coding method based on coefficient importance comprises:

determining the need to encode the coefficients of the current image block according to a layered coding method based on coefficient importance using at least one of the following methods:

determining based on a local configuration of an encoder, determining based on features of the current image block, determining based on a video sequence where the current image block is located, determining based on a known decoder capability or configuration for a coded bitstream to be received, determining based on an adopted dependent enhancement layer coding method, and determining based on received indicative information, wherein the indicative information comes from a transmitting terminal of an uncoded image or a receiving terminal of a coded image.

8. The method according to claim 6, further comprising:

reordering the coefficients of the current image block based on coefficient importance; and determining a coding layer to which each coefficient belongs based on a position of each reordered coefficient of the current image block.

9. The method according to claim 6, wherein after the coding the coefficients of the current image block based on a processing result of the target sign processing, the method further comprises at least one of the following:

adding indicative information used to indicate the type of the target sub-bitstream to the target sub-bitstream; and adding identification information to the target sub-bitstream, wherein the identification information is used to indicate at least one of the following: when decoding a reference layer sub-bitstream, a decoding terminal needs to store a decoding result or decoding metadata for decoding a subsequent enhancement layer sub-bitstream; and when decoding the enhancement layer sub-bitstream, the decoding terminal obtains a decoding result or decoding metadata of the reference layer sub-bitstream that the enhancement layer sub-bitstream depends on.

10. A decoding method, comprising:

obtaining target sign processing methods and target sign processing parameters corresponding to various sub-bitstreams in a case of receiving a layered coding video bitstream;

determining signs of coefficients corresponding to the various sub-bitstreams based on the target sign processing methods and the target sign processing parameters corresponding to the various sub-bitstreams; and decoding the various sub-bitstreams in the layered coding video bitstream based on the signs of the coefficients corresponding to the various sub-bitstreams;

wherein the obtaining target sign processing methods and target sign processing parameters corresponding to various sub-bitstreams comprises:

determining, based on a type of the currently decoded sub-bitstream, a target sign processing method and target sign processing parameters corresponding to the currently decoded sub-bitstream;

wherein the type of the currently decoded sub-bitstream comprises at least one of a base layer sub-bitstream or an enhancement layer sub-bitstream.

11. The method according to claim 10, wherein the obtaining target sign processing parameters corresponding to various sub-bitstreams comprises at least one of the following:

obtaining the target sign processing parameters from local configuration information;

obtaining the target sign processing parameters from the layered coding video bitstream or a target media file; and determining the target sign processing parameters based on parameter information included in the layered coding video bitstream.

12. The method according to claim 10, wherein after the decoding the various sub-bitstreams in the layered coding video bitstream based on the coefficients corresponding to the various sub-bitstreams and the signs of the coefficients, the method further comprises:

in a case that a currently decoded sub-bitstream is determined as a reference layer sub-bitstream, storing a decoding result of the currently decoded sub-bitstream; or, in a case that a currently decoded sub-bitstream is determined as a reference layer sub-bitstream, storing decoding metadata of the currently decoded sub-bitstream.

13. The method according to claim 10, further comprising at least one of the following:

obtaining indicative information carried in the layered coding video bitstream, and determining a type of a currently decoded sub-bitstream based on the indicative information; and obtaining identification information carried in the layered coding video bitstream, and performing, based on the identification information, at least one of the following operations: in the case of the currently decoded sub-bitstream is a reference layer sub-bitstream, storing a decoding result or decoding metadata of the currently decoded sub-bitstream for decoding a subsequent enhancement layer sub-bitstream; and in the case of the currently decoded sub-bitstream is an enhancement layer sub-bitstream, obtaining a decoding result or decoding metadata of a reference layer sub-bitstream that the enhancement layer sub-bitstream depends on.

14. The method according to claim 10, wherein the obtaining target sign processing methods and target sign processing parameters corresponding to various sub-bitstreams comprises:

obtaining a target quantity of sign processing methods corresponding to a currently decoded sub-bitstream; and determining, based on the target quantity, a target sign processing method and target sign processing parameters corresponding to the currently decoded sub-bitstream.

15. The method according to claim 14, wherein the determining, based on the target quantity, a target sign processing method and target sign processing parameters corresponding to the currently decoded sub-bitstream comprises:

in a case that the target quantity is 1, determining a target sign processing method and target sign processing parameters corresponding to the currently decoded sub-bitstream based on the type of the currently decoded sub-bitstream; and in a case that the target quantity is greater than 1, respectively determining each target sign processing method and corresponding target sign processing parameters, and a processing order of the target sign processing methods.

16. The method according to claim 10, wherein the determining, based on a type of the currently decoded sub-bitstream, a target sign processing method and target sign processing parameters corresponding to the currently decoded sub-bitstream comprises:

in a case that a currently decoded sub-bitstream is determined as a dependent enhancement layer sub-bitstream, obtaining decoding metadata of a reference layer sub-bitstream of the currently decoded sub-bitstream included in the layered coding video bitstream, and determining coefficients of the currently decoded sub-bitstream and signs of the coefficients based on the decoding metadata of the reference layer sub-bitstream; and/or, in a case that a currently decoded sub-bitstream is determined as a dependent enhancement layer sub-bitstream, obtaining a decoded image from stored reference images corresponding to the currently decoded sub-bitstream, and determining coefficients of the currently decoded sub-bitstream and signs of the coefficients based on the decoded image.

17. The method according to claim 15, wherein the determining signs of coefficients corresponding to the various sub-bitstreams based on the target sign processing methods and the target sign processing parameters corresponding to the various sub-bitstreams comprises:

determining signs of first coefficients included in the currently decoded sub-bitstream based on sign prediction processing and sign prediction processing parameters, wherein the first coefficients are coefficients that are subjected to the sign prediction processing;

determining signs of second coefficients included in the currently decoded sub-bitstream based on sign bit hiding processing and sign bit hiding processing parameters, wherein the second coefficients are coefficients that are subjected to the sign bit hiding processing; and determining signs of third coefficients included in the currently decoded sub-bitstream, wherein the third coefficients are coefficients in the currently decoded sub-bitstream, excluding the first coefficients and the second coefficients.

18. A non-transitory computer-readable storage medium, having a computer program stored therein, wherein the computer program is configured to, when executed by a processor, implement the steps of the method as claimed in claim 1.

19. An electronic apparatus, comprising a memory, a processor, and a computer program stored on the memory and running on the processor, wherein the processor is configured to execute the computer program to:

determine a target type of a currently coded target sub-bitstream, and a target sign processing method and target sign processing parameters corresponding to the target type;

perform target sign processing on a coefficient of a current image block based on the target sign processing parameters and the target sign processing method; and encode the coefficient of the current image block based on a processing result of the target sign processing;

wherein the target type comprises at least one of a base layer sub-bitstream or an enhancement layer sub-bitstream.

* * * * *